(12) United States Patent
Jain et al.

(10) Patent No.: US 11,146,902 B2
(45) Date of Patent: Oct. 12, 2021

(54) FACILITATING A BONE CONDUCTION OTOACOUSTIC EMISSION TEST

(71) Applicant: The Johns Hopkins University, Baltimore, MD (US)

(72) Inventors: Aseem Jain, Herndon, VA (US); Gianluca Croso, Seattle, WA (US); Sanjay Elangovan, Chicago, IL (US); Andrew Sean Tsai, New York, NY (US); Richard J. Chen, Gaithersburg, MD (US); Taha Mirza Baig, Foxborough, MA (US); Gavin Mischler, Wilmette, IL (US); Adarsha Malla, Dublin, GA (US); Darian Low, Baltimore, MD (US); Francis Xavier Creighton, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 0 days.

(21) Appl. No.: 16/555,909

(22) Filed: Aug. 29, 2019

(65) Prior Publication Data
US 2021/0067888 A1    Mar. 4, 2021

(51) Int. Cl.
*H04R 29/00* (2006.01)
*G06F 3/16* (2006.01)
(Continued)

(52) U.S. Cl.
CPC ........... *H04R 29/005* (2013.01); *G06F 3/165* (2013.01); *H04R 1/406* (2013.01); *H04R 3/005* (2013.01);
(Continued)

(58) Field of Classification Search
CPC .... H04R 29/00; H04R 3/005; H04R 2420/07; H04R 1/406; H04R 2460/13; H04R 29/005; G06F 3/165
(Continued)

(56) References Cited

U.S. PATENT DOCUMENTS 2,788,072 A    4/1957  Goodwin
4,374,526 A    2/1983  Kemp
(Continued)

FOREIGN PATENT DOCUMENTS

CN    101309629    11/2008
GB    2205403 A    12/1988
(Continued)

OTHER PUBLICATIONS

International Search Report and Written Opinion in corresponding International Applicaiton No. PCT/US2020/048457 dated Nov. 19, 2020, 7 pages.
(Continued)

*Primary Examiner* — Paul Kim
(74) *Attorney, Agent, or Firm* — MH2 Technology Law Group, LLP

(57) ABSTRACT

A device may receive a request to initiate an audio test and may generate, based on the request, one or more instructions to control a bone transducer device and a microphone device. The device may send the one or more instructions to a control device and may receive, after sending the one or more instructions, audio data from the control device. The device may process the audio data to determine whether the audio data includes an otoacoustic emission (OAE) and may cause at least one action to be performed based on determining whether the OAE is included in the audio data.

21 Claims, 16 Drawing Sheets

(51) Int. Cl.
*H04R 1/40* (2006.01)
*H04R 3/00* (2006.01)

(52) U.S. Cl.
CPC ...... *H04R 2420/07* (2013.01); *H04R 2460/13* (2013.01)

(58) Field of Classification Search
USPC .......................................................... 381/58
See application file for complete search history.

(56) References Cited

U.S. PATENT DOCUMENTS

| | | | |
|---|---|---|---|
| 6,110,126 | A | 8/2000 | Zoth et al. |
| 6,231,521 | B1 | 5/2001 | Zoth et al. |
| 6,974,421 | B1 | 12/2005 | Causevic et al. |
| 7,370,533 | B2 | 5/2008 | Davis |
| 8,308,653 | B2 | 11/2012 | Harrison et al. |
| 8,795,192 | B2 | 8/2014 | Allen et al. |
| 9,642,573 | B2 | 5/2017 | Zhao et al. |
| 2004/0073135 | A1 | 4/2004 | Wadsen et al. |
| 2007/0112279 | A1 | 5/2007 | Iseberg et al. |
| 2017/0273602 | A1 | 9/2017 | Lasry et al. |
| 2018/0146293 | A1 | 5/2018 | Hardi |

FOREIGN PATENT DOCUMENTS

| | | | |
|---|---|---|---|
| JP | 10234713 A | 9/1998 | |
| WO | 2015142312 | 9/2015 | |
| WO | WO-2015142312 A1 * | 9/2015 | ............ G16H 40/67 |
| WO | 2017040327 | 3/2017 | |

OTHER PUBLICATIONS

Govender et al., "Assessing the efficacy of asynchronous telehealth-based hearing screening and diagnostic services using automated audiometry in a rural South African school," The South African Journal of Communication Disorders, vol. 65, No. 1, Published Jul. 5, 2018.

* cited by examiner

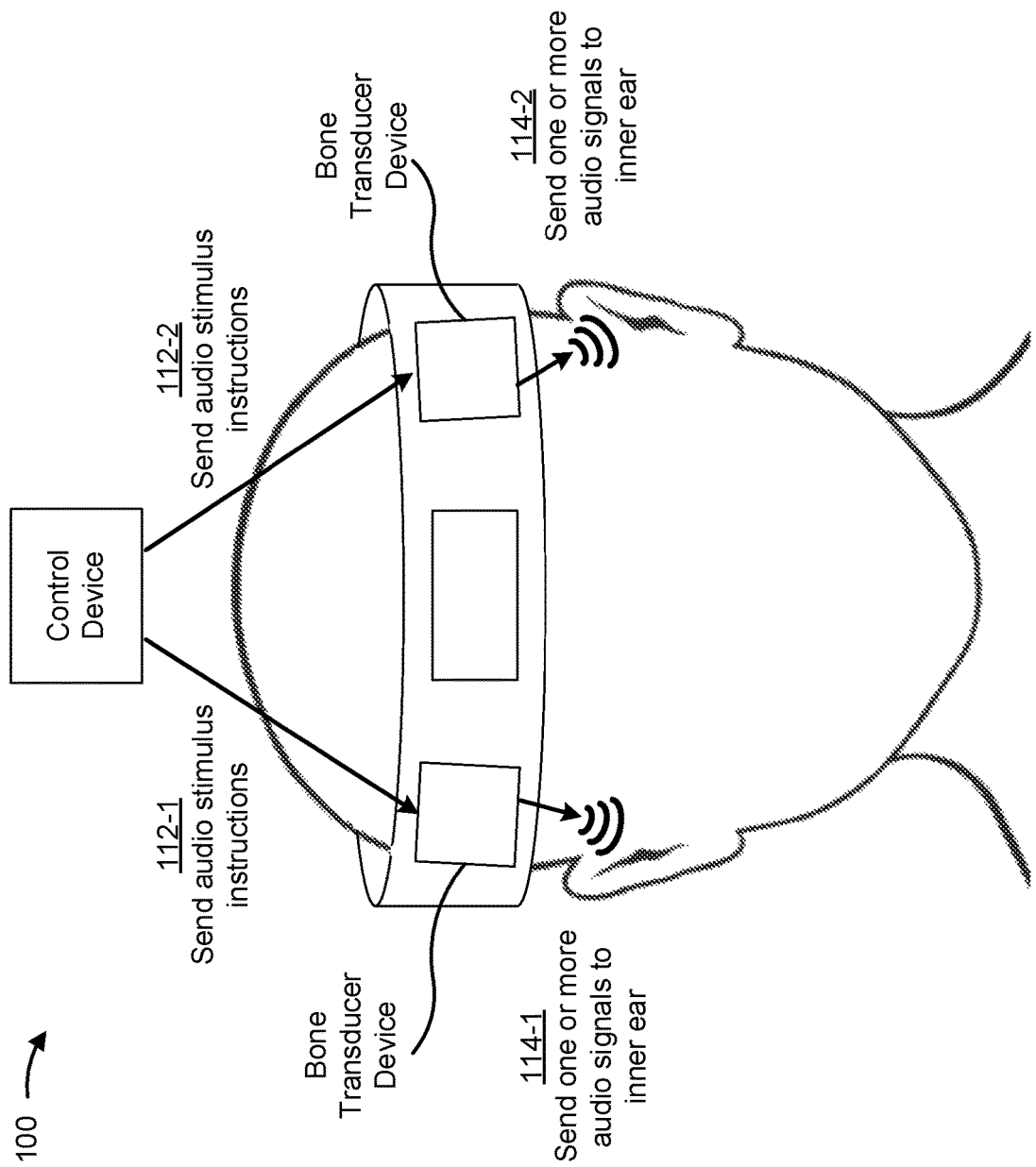

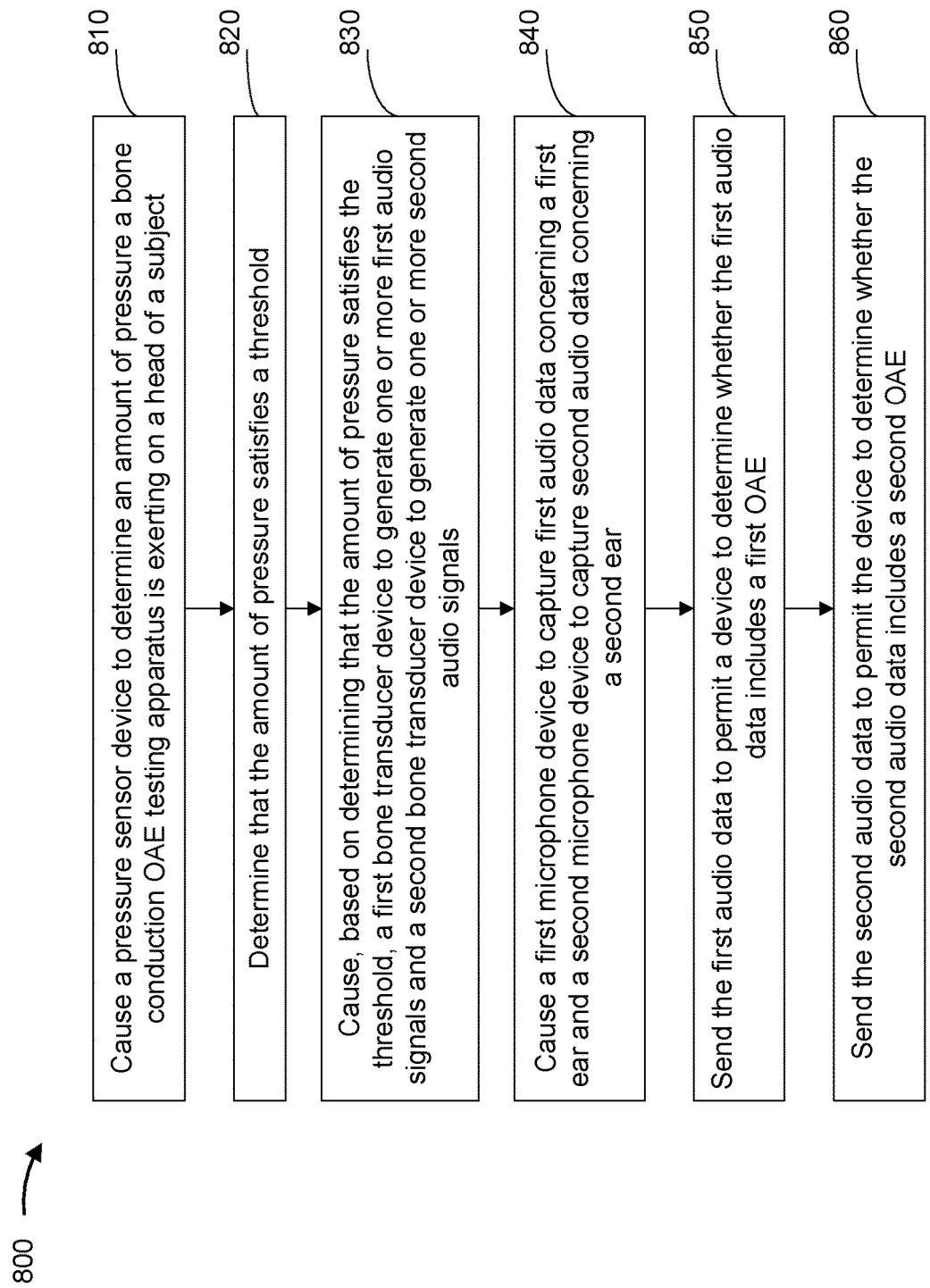

FACILITATING A BONE CONDUCTION OTOACOUSTIC EMISSION TEST

BACKGROUND

Otoacoustic emissions (OAEs) are low intensity sounds measured in an ear canal that reflect movement of outer hair cells in the cochlea of an ear. The outer hair cells facilitate a person's ability to hear by amplifying the frequencies of sounds received in the ear canal.

SUMMARY

According to some implementations, a method may include receiving, by a device, a request to initiate an audio test; generating, by the device and based on the request, one or more instructions to control a bone transducer device and a microphone device; sending, by the device, the one or more instructions to a control device; receiving, by the device and after sending the one or more instructions, audio data from the control device; processing, by the device, the audio data to determine whether the audio data includes an otoacoustic emission (OAE); and causing, by the device, at least one action to be performed based on determining whether the OAE is included in the audio data.

According to some implementations, a bone conduction OAE testing apparatus may comprise a pressure sensor device to be placed at a first position on a head of a subject; a bone transducer device to be placed at a second position on the head of the subject; a microphone device to be placed in an ear canal of an ear of the subject; and a control device to: cause the pressure sensor device to determine an amount of pressure the bone conduction OAE testing apparatus is exerting on the head of the subject; determine that the amount of pressure satisfies a threshold; cause, based on determining that the amount of pressure satisfies the threshold (e.g., to ensure appropriate signal conduction), the bone transducer device to generate a first audio signal at a first frequency and a second audio signal at a second frequency; cause the microphone device to capture audio data concerning the first audio signal and the second audio signal; and provide the audio data to permit a device to determine whether the audio data includes an OAE.

According to some implementations, a bone conduction OAE testing apparatus may include a pressure sensor device to be placed at a first position on a head of a subject; a first bone transducer device to be placed at a second position on the head of the subject; a second bone transducer device to be placed at a third position on the head of the subject; a first microphone device to be placed in an ear canal of a first ear of the subject; a second microphone device to be placed in an ear canal of a second ear of the subject; and a control device to: cause the pressure sensor device to determine an amount of pressure the bone conduction OAE testing apparatus is exerting on the head of the subject; determine that the amount of pressure satisfies a threshold; cause, based on determining that the amount of pressure satisfies the threshold, the first bone transducer device to generate one or more first audio signals and the second bone transducer device to generate one or more second audio signals; cause the first microphone device to capture first audio data concerning the one or more first audio signals and the second microphone device to capture second audio data concerning the one or more second audio signals; send the first audio data to permit a device to determine whether the first audio data includes a first OAE; and send the second audio data to permit the device to determine whether the second audio data includes a second OAE.

BRIEF DESCRIPTION OF THE DRAWINGS

FIGS. 1A-1G are diagrams of example implementations described herein.

FIGS. 6-8 are flow charts of example processes for facilitating a bone conduction OAE test.

DETAILED DESCRIPTION

Figure 1A:
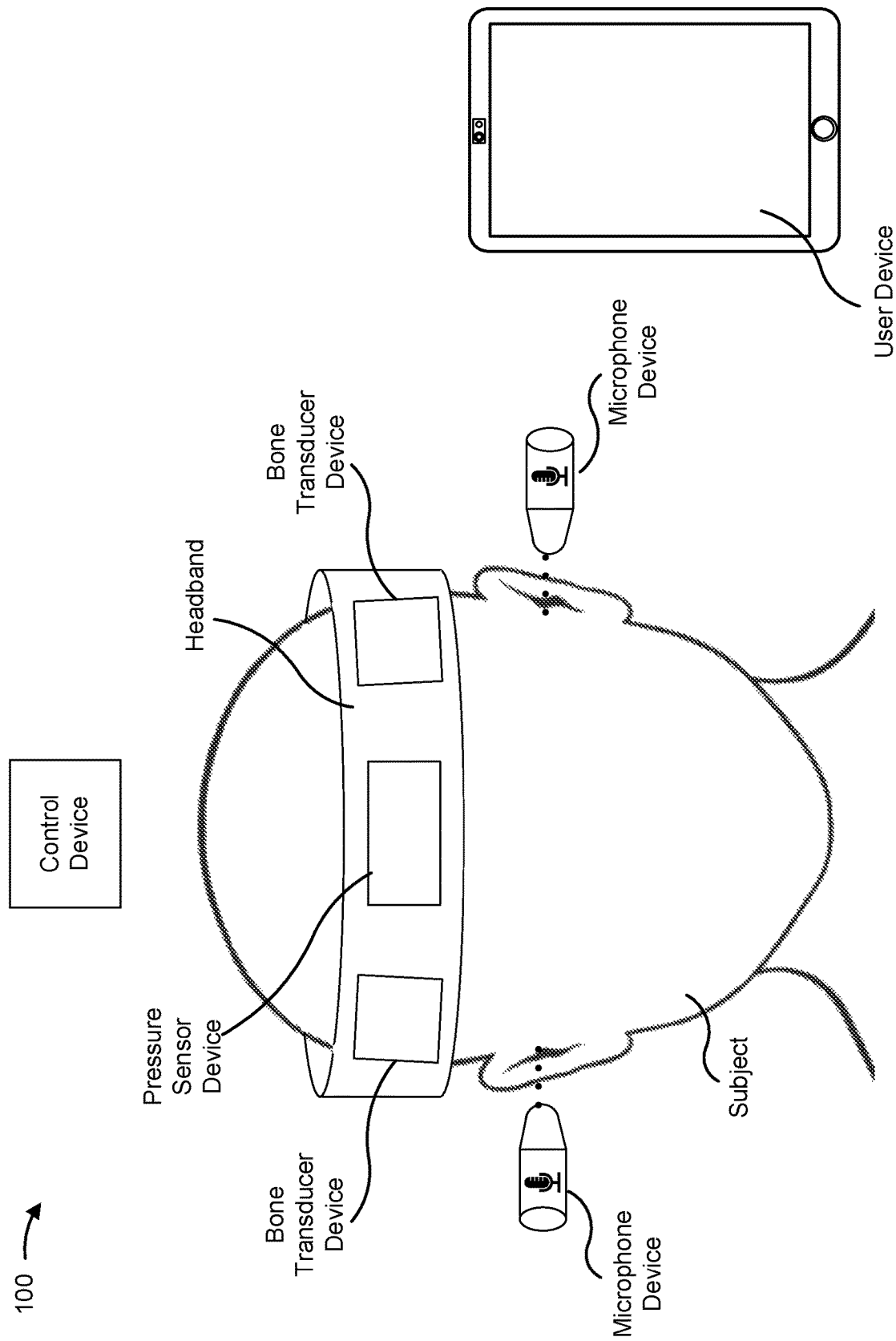

The following detailed description of example implementations refers to the accompanying drawings. The same reference numbers in different drawings may identify the same or similar elements.

According to some estimates, over 450 million people around the world have a debilitating hearing impairment, and the World Health Organization estimates that by 2050, the number will increase to over 900 million people. Globally, over 30 million children are estimated to have a debilitating hearing impairment, of which 90% are in developing countries. Unfortunately, if a hearing impairment is not diagnosed and treated within a child's first year of life, the child may suffer significant consequences, such as deficits in motor skill development, cognitive performance, speech and language development, psychosocial development, and/or the like.

In some instances, an otoacoustic emission (OAE) screening device may be used to screen a subject, such as infant, for a hearing impairment. In some cases, the OAE screening device may utilize a probe that inserts into an ear canal of a subject's ear and generates a sound stimulus (e.g., a sound wave with a particular frequency). The sound stimulus travels through the ear canal to vibrate the tympanic membrane (e.g., the eardrum), which creates mechanical vibrations that propagate through the middle ear to the cochlea. Based on the mechanical vibrations, the outer hair cells of the cochlea expand and contract to create an OAE (e.g., a sound wave with a frequency that corresponds to the particular frequency) that propagates back to the ear canal. The probe may include a microphone to obtain audio data associated with the OAE (or a lack of the OAE). The OAE screening device may then analyze the audio data to determine if the subject suffers from a hearing impairment. A lack of an OAE or an OAE with a reduced signal strength (e.g., a sound pressure level) may indicate an inner ear abnormality.

Often, however, OAE screening devices are complex devices. For example, in many cases, an OAE screening device may use a probe that needs to fit into an ear canal of a subject (e.g., a newborn infant) to emit a sound stimulus and capture audio data. Consequently, fitting a sound emitting device and a microphone into the small form factor of the probe increases a design complexity of the OAE screening device. Further, in some cases, because the probe needs to include the sound emitting device and the microphone, the probe may be ill-shaped to create a seal in the ear canal to block background noise from entering the ear canal, which may allow the background noise to enter the ear canal and interfere with the sound stimulus and/or an OAE as the stimulus and/or the OAE propagate through the ear. This may inhibit an ability of the OAE screening device to provide reliable results in environments with high levels of ambient noise. Additionally, in some cases, the OAE screening device may utilize a customized processor to process audio data, a customized display screen to display test results, and/or other components that further increase a complexity and therefore a cost of manufacturing the OAE screening device.

For these reasons, OAE screening devices are often too expensive to be purchased for use in the developing world, which inhibits an ability of health officials to screen large populations of people for hearing impairments. Moreover, in many cases, OAE screening devices require a trained operator (e.g., an audiologist, a physician, and/or the like) to conduct an OAE screening test and/or to interpret results of the OAE screening test, but such trained operators are rare in the developing world (e.g., 1 trained doctor per 6 million people). Further, developing countries often do not have sufficient infrastructure, such as soundproof rooms, to provide a setting that enables OAE screening devices to provide reliable results. Accordingly, a simpler and more robust OAE screening device is needed to aid in screening and identifying an ever-increasing population of hearing-impaired people.

Some implementations described herein provide a bone conduction OAE testing apparatus and/or a user device to perform an OAE test. In some implementations, the user device may generate one or more instructions to cause a control device of the bone conduction OAE testing bone apparatus to cause a bone transducer device of the bone conduction OAE testing apparatus to generate a first audio signal at a first frequency and a second audio signal at a second frequency to travel to a subject's cochlea via one or more bones (e.g., a mastoid process) of the subject rather than via an ear canal and/or tympanic membrane of the subject. In some implementations, the control device may cause a microphone device of the bone conduction OAE testing apparatus to capture audio data concerning the first audio signal and the second audio signal (e.g., capture an OAE created by the outer hair cells of the cochlea in response to the first audio signal and/or the second audio signal). In some implementations, the control device may send the audio data to the user device, which may process the audio data to determine whether the audio data includes an OAE, and cause at least one action to be performed based on determining whether the OAE is included in the audio data (e.g., display a message on a display screen of the user device indicating whether the subject has a hearing impairment and/or whether the subject needs additional hearing tests).

In this way, some implementations described herein provide a simpler and more robust approach to performing an OAE screening test. For example, the bone conduction OAE testing apparatus may use simple, modular components (e.g., a bone transducer device, a microphone device, a control device, and/or the like) that may be used to create stimulus sounds and capture associated audio data. Additionally, the bone transducer device and the microphone device are not coupled together (e.g., to fit into a probe that inserts into an ear canal of the subject), which reduces a design complexity of the bone conduction OAE testing apparatus as compared to a typical OAE screening device.

Further, a user device (e.g., an existing smart phone of the operator of the bone conduction OAE testing apparatus) may obtain the audio data from the bone conduction OAE testing apparatus and process the audio data to determine whether a subject suffers from a hearing impairment, which eliminates a need for the bone conduction OAE testing apparatus to have additional processing components.

Additionally, the bone transducer device of the bone conduction OAE testing apparatus may generate an audio signal that travels directly to the cochlea of the subject, which may prevent background noise from interfering with the audio signal. Further, because the microphone device of the bone conduction OAE testing apparatus is less complex than a probe of a typical OAE screening device, the microphone device may be more easily shaped to create a seal in the ear canal to block background noise from entering the ear canal. Accordingly, little to no noise (e.g., background noise) may interfere with the audio signal and/or an OAE as the audio signal and/or the OAE propagate through the ear. This may increase a signal-to-noise ratio associated with the audio data captured by the microphone device, which in turn may enable the user device to more accurately determine whether an OAE is present in the audio data. This may increase a reliability of an OAE screening test that uses the bone conduction OAE testing apparatus and the user device, which may allow the OAE screening test to be conducted in a noisier environment than with a typical OAE screening device.

For these reasons, the bone conduction OAE testing apparatus and/or the user device described in some implementations herein may provide a simple, low cost solution for screening people for hearing impairments. Accordingly, health officials may be better able to screen and identify hearing-impaired people in developing countries and across the world.

FIGS. 1A-1G are diagrams of one or more example implementations 100 described herein. Example implementation(s) 100 may include a control device, one or more bone transducer devices, a pressure sensor device, one or more microphone devices, a user device, and/or the like. In one example, as shown in FIG. 1A, the pressure sensor device may be placed at a first position on a head of an OAE testing subject (e.g., on the forehead, the back of the head, and/or the like), a first bone transducer device may be placed at a second position on the head of the subject (e.g., on a mastoid process, a temporal bone, and/or an area near a first ear of the subject), a second bone transducer device may be placed at a third position on the head of the subject (e.g., on a mastoid process, a temporal bone, and/or an area near a second ear of the subject), a first microphone device may be placed in an ear canal of the first ear, and/or a second microphone device may be placed in an ear canal of the second ear. The subject may be a neonate, an infant, a child, or an adult person. In some implementations, the subject may be an animal (e.g., an animal with an ear capable of producing an OAE).

In some implementations, a headband, or similar supporting structure, may physically support the control device, the one or more bone transducer devices, the pressure sensor device, and/or the one or more microphone devices when the headband is on and/or around a head of the subject. In some implementations, the headband may cause the pressure sensor to contact the head of the subject at a first position (e.g., the forehead, the back of the head, and/or the like) and/or may cause a bone transducer device to contact the head at a second position (e.g., on a mastoid process, a temporal bone, an area near an ear of the subject, and/or the like). The headband may comprise an elastic material and may include one or more tightening components (e.g., one or more Velcro fasteners) to secure the headband to the head of the subject and ensure a tight connection between the head of the subject and one or more of the one or more bone transducer devices and the pressure sensor device. In some implementations, the headband may hold the control device at a position to enable the control device to communicate with and control the pressure sensor device, the one or more bone transducer devices, and the one or more microphone devices. In some implementations, the headband may allow the one or more microphone devices to hang from the headband (e.g., via a string, a tether, a wire, and/or the like) such that a microphone device can be inserted into an ear canal of an ear of the subject. In some implementations, a bone conduction OAE testing apparatus may comprise the headband, the control device, the one or more bone transducer devices, the pressure sensor device, and/or the one or more microphone devices.

In some implementations, the control device, the one or more bone transducer devices, the pressure sensor device, the one or more microphone devices, the user device, and/or the like may communicate with each other using a wired connection, a wireless connection, or a combination of wired and wireless connections. For example, the control device, the one or more bone transducer devices, the pressure sensor device, the one or more microphone devices, and/or the user device may communicate via a non-cellular, wireless connection, such as a Wi-Fi connection, a Bluetooth connection (e.g., a Bluetooth connection that supports mesh networking), a Zigbee connection (e.g., a Zigbee connection that supports mesh networking), a near field communication (NFC) connection, and/or the like. As another example, the control device, the one or more bone transducer devices, the pressure sensor device, the one or more microphone devices, and/or the user device may communicate via a wired connection, such as a universal serial bus (USB) connection, an Ethernet connection, and/or the like.

In a specific example, the control device may communicate with the pressure sensor device, the one or more bone transducer devices, and/or the one or more microphone devices via a first wireless communication protocol (e.g., a Bluetooth communication protocol), and the control device may communicate with the user device via a second wireless communication protocol (e.g., a Wi-Fi communication protocol). In another example, the control device may communicate with a first set of the pressure sensor device, the one or more bone transducer devices, and/or the one or more microphone devices via one or more first wired connections (e.g., one or more USB connections), with a second set of the pressure sensor device, the one or more bone transducer devices, and/or the one or more microphone devices via a wireless communication protocol (e.g., a Zigbee communication protocol), and with the user device via a second wired connection (e.g., an Ethernet connection).

Figure 1B:
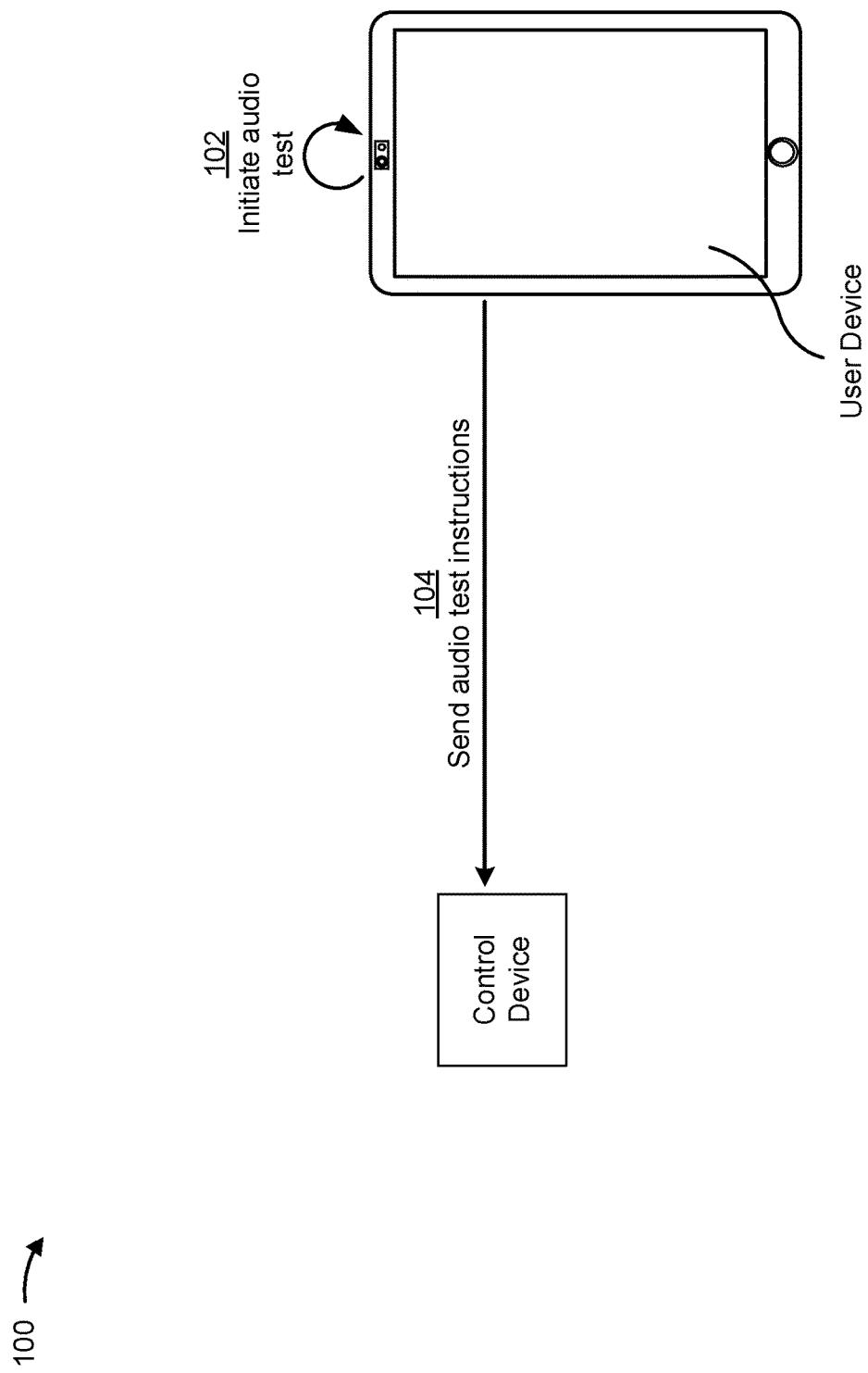

As shown in FIG. 1B and by reference number 102, the user device may initiate an audio test (e.g., an OAE audio test). In some implementations, a user may interact with a user interface of the user device to cause the user device to run a program (e.g., a mobile device application, a desktop computer application, a cloud-based application, an application built to run on a custom field-programmable gate array (FPGA) chip or microcontroller of the user device, and/or the like) that enables the user to input a request into the user device to initiate the audio test. The user may be a highly trained healthcare provider capable of performing and/or assessing hearing screening tests, such as an audiologist; an ear, nose, and throat (ENT) specialist; an otologist; a neurologist; a neonatologist; a pediatrician; a general practitioner; and/or the like. Additionally, or alternatively, the user may be a less trained individual, such as a midwife, a local healthcare provider, an aid worker, and/or the like.

In some implementations, the user device (e.g. based on running the program) may allow the user to input (e.g., via the user interface of the user device) information concerning the audio test, such as a date and/or time of the audio test, an indication of one or more sound frequencies to be tested during the audio test, a sound pressure level (e.g., in decibels) associated with the one or more sound frequencies, a number of times the one or more sound frequencies are to be tested, and/or the like into the user device. Additionally, or alternatively, the user device (e.g. based on running the program) may allow the user to input (e.g., via the user interface of the user device) information concerning a subject of the audio test, such as a date of birth of the subject, an age of the subject, a sex of the subject, a name of the subject, an identifier associated with the subject (e.g., a unique identification string and/or number), and/or the like into the user device. In some implementations, the user device may determine the information concerning the audio test based on the information concerning the subject of the audio test. For example, when the user enters an age of the subject (e.g., 1 day old newborn baby), the user device may determine one or more sound frequencies to be tested, a sound pressure level associated with the one or more sound frequencies, and/or the like. In some implementations, the user device may cause the request, the information concerning the audio test, the information concerning the subject of the audio test, and/or the like to be stored in a data structure (e.g., a data structure included in the user device, a data structure associated with a server device, a cloud-based data structure, and/or the like).

In some implementations, the user may interact with the user interface of the user device (e.g., after inputting the request, the information concerning the audio test, the information concerning the subject, and/or the like) to cause the user device to execute the audio test. Accordingly, the user device may send a signal to the control device that causes the control device to activate, turn on, and/or the like the pressure sensor device, the one or more bone transducer devices, the one or more microphone devices, and/or the like. Additionally, or alternatively, the user may manually activate, turn on, and/or the like the control device, the pressure sensor device, the one or more bone transducer devices, the one or more microphone devices, and/or the like.

As shown by reference number 104, the user device may generate and send one or more audio test instructions to the control device (e.g., based on the user causing the user device to execute the audio test). The user device may generate the one or more audio test instructions based on the request, the information concerning the audio test, the information concerning the subject, and/or the like. The one or more audio test instructions may include instructions to control the pressure sensor device, the one or more bone transducer devices, and/or the one or more microphone devices.

For example, the one or more audio test instructions may include a set of instructions to cause the pressure sensor device to obtain pressure data concerning tautness of the headband. As another example (e.g., for a transient OAE (tOAE) test), the one or more audio test instructions may include a set of instructions to cause a bone transducer device to generate an audio signal at a particular frequency and/or at a particular sound pressure level, and a different set of instructions for a microphone device to capture audio data associated with the audio signal. In another example (e.g., for a distortion product OAE (dpOAE) test), the one or more audio test instructions may include a first set of instructions to cause a bone transducer device to simultaneously generate a first audio signal at a first frequency and/or at a first sound pressure level, and a second audio signal at a second frequency and/or at a second sound pressure level. The first set of instructions may specify that the first audio signal is to have a particular relationship with the second audio signal (e.g., the first frequency of the first audio signal is to be 1.2 to 1.3 times greater than the second frequency of the second audio signal). Further, the one or more audio test instructions may include a second set of instructions for a microphone device to capture audio data associated with the first audio signal and the second audio signal.

Figure 1C:
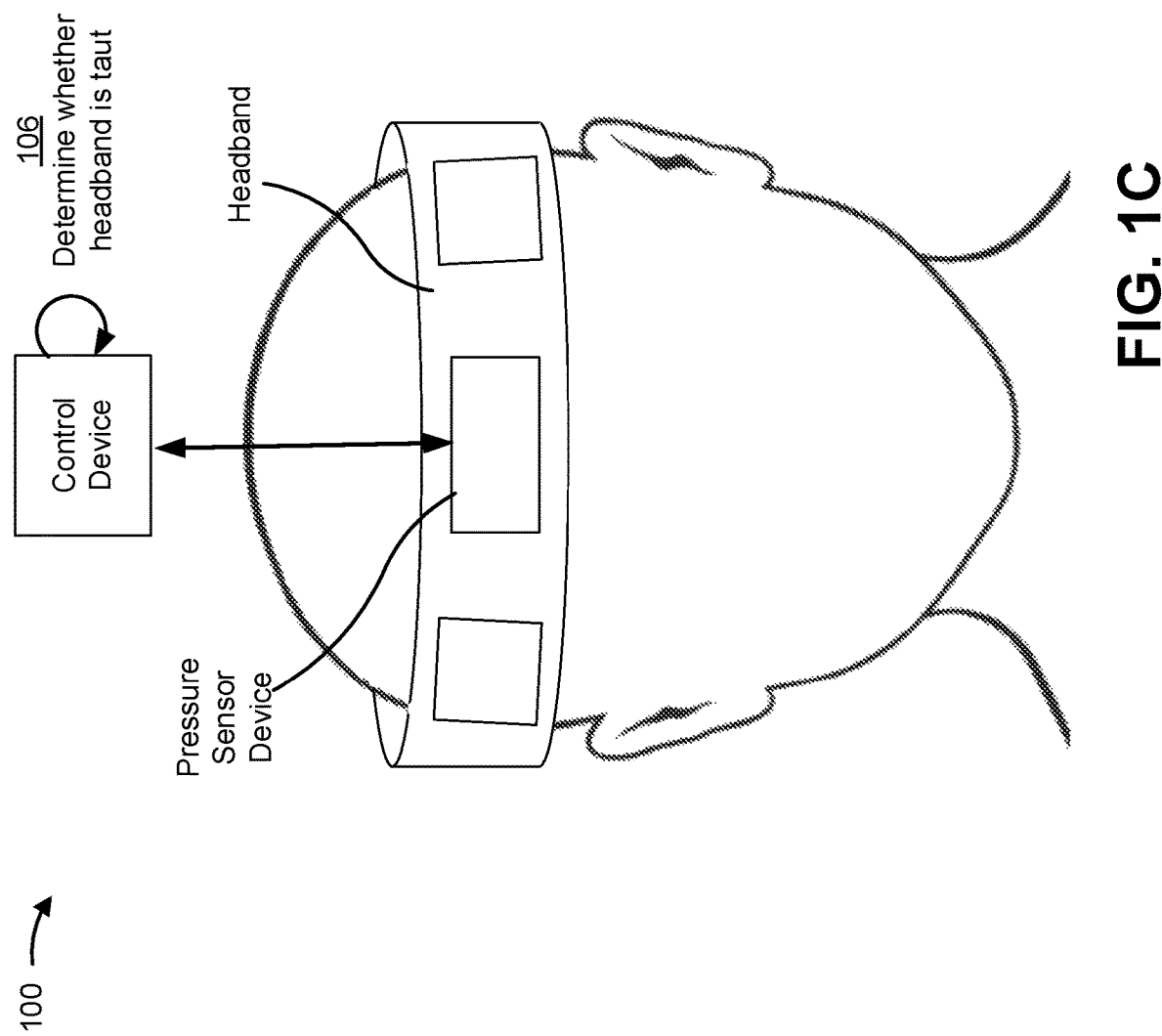

As shown in FIG. 1C and by reference number 106, the control device may determine (e.g., based on the one or more audio test instructions) whether the headband is taut (e.g., taut enough to ensure a tight connection between the head of the subject and the pressure sensor device and the one or more bone transducer devices). For example, the control device may cause the pressure sensor device to determine pressure data concerning tautness of the headband (e.g., an amount of pressure exerted by the headband on the head of the subject in pascals, pounds per square inch, and/or the like) and send the pressure data to the control device. In some implementations, to determine whether the headband is taut, the control device may determine whether the pressure data satisfies a threshold. For example, the client device may determine that the headband is taut when the pressure data is greater than or equal to the threshold, that the headband is not taut when the pressure data is less than the threshold, and/or the like. Additionally, or alternatively, the control device may send the pressure data to the user device for the user device to determine whether the headband is taut, in a similar manner.

When the control device determines that the headband is not taut, the control device may generate and send a message to the user device indicating that the headband is not taut and/or that the audio test cannot be conducted. The user device, upon receiving the message, may cause the message and/or information indicating that the headband needs to be tightened to be displayed on a display screen of the user device. Additionally, or alternatively, when the user device determines that the headband is not taut, the user device may generate the message and may cause the message and/or information indicating that the headband needs to be tightened to be displayed on the display screen of the user device.

When the control device determines that the headband is taut, the control device may generate and send a message to the user device indicating that the headband is taut and/or that the audio test will be conducted. The user device, upon receiving the message, may cause the message and/or information indicating that the audio test will be conducted to be displayed on the display screen of the user device. Additionally, or alternatively, when the user device determines that the headband is taut, the user device may generate the message and may cause the message and/or information indicating that the audio test will be conducted to be displayed on the display screen of the user device.

Figure 1D:
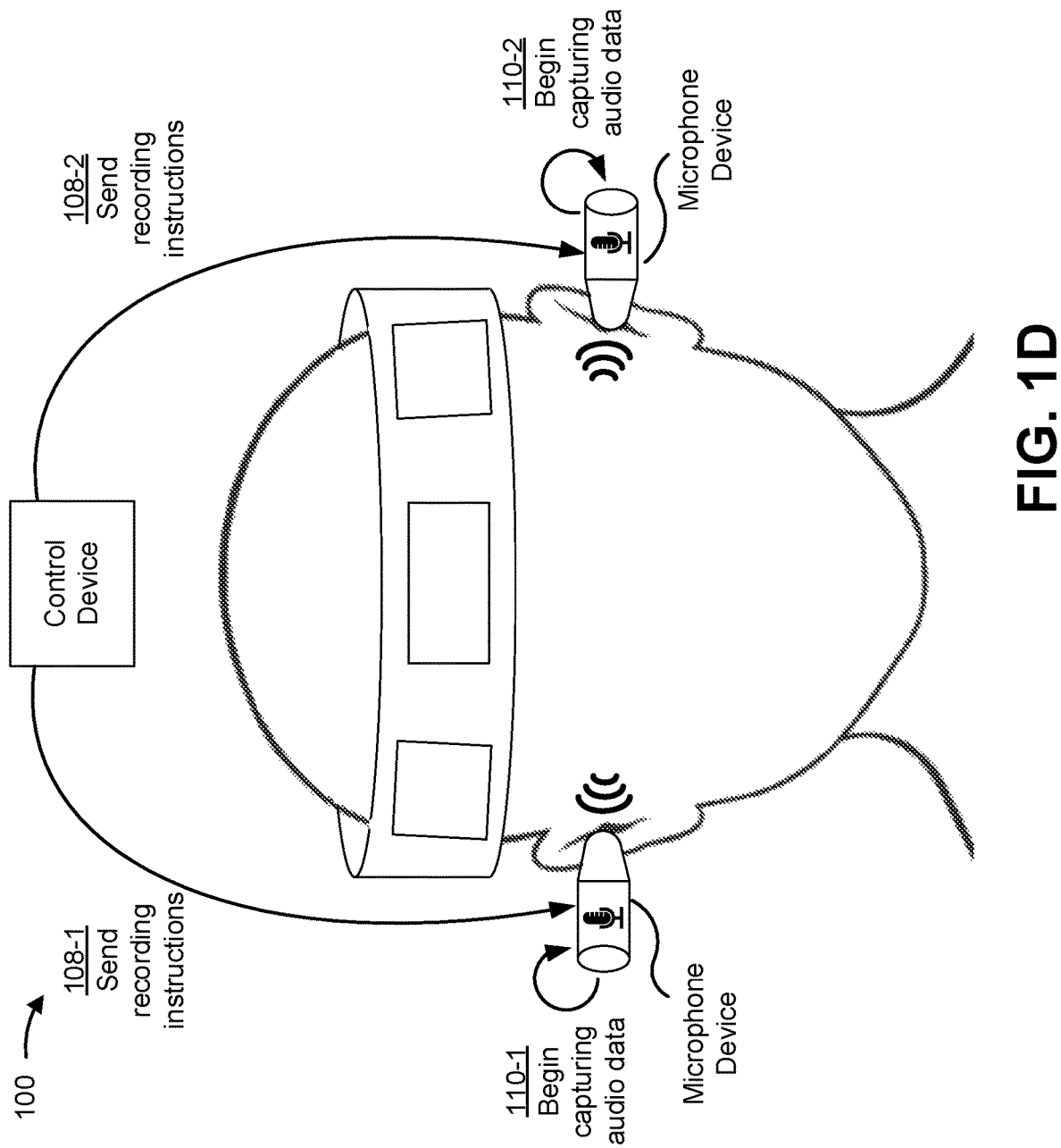

As shown in FIG. 1D and by reference numbers 108-1 and 108-2, the control device may generate and send (e.g., based on the one or more audio test instructions) recording instructions to the one or more microphone devices. The recording instructions may indicate that the one or more microphone devices are to begin capturing audio data. In some implementations, the control device may send recording instructions to a single microphone device (e.g., a microphone device associated with a particular ear of the subject) and/or two microphone devices (e.g., a respective microphone device associated with each ear of the subject).

As shown by reference numbers 110-1 and 110-2, the one or more microphone devices may begin capturing audio data (e.g., based on the recording instructions). For example, a first microphone device may commence capturing first audio data concerning a first ear of the subject and/or a second microphone device may begin capturing second audio data concerning a second ear of the subject. In this way, each microphone device of the one or more microphone devices may capture a respective background noise print (e.g., an audio signature associated with background noise) associated with each ear. In some implementations, a microphone device may capture a background noise print for a particular amount of time (e.g., one to three seconds) before the one or more bone transducer devices generate and send audio signals (e.g., as described herein in relation to FIG. 1E).

As shown in FIG. 1E and by reference numbers 112-1 and 112-2, the control device may send (e.g., based on the one or more audio test instructions) audio stimulus instructions to the one or more bone transducer devices (e.g., after sending the recording instructions to the one or more microphone devices). For example, for a tOAE test, the audio stimulus instructions may include instructions for a particular bone transducer device, of the one or more bone transducer devices, to generate an audio signal at a particular frequency and/or at a particular sound pressure level. As another example, for a dpOAE test, the audio stimulus instructions may include instructions for a particular bone transducer device, of the one or more bone transducer devices, to simultaneously generate a first audio signal at a first frequency and/or at a first sound pressure level, and a second audio signal at a second frequency and/or at a second sound pressure level.

As shown by reference numbers 114-1 and 114-2, the one or more bone transducer devices may respectively send one or more audio signals to an inner ear of the subject (e.g., based on the audio stimulus instructions). For example, for a tOAE test, a bone transducer device may cause a vibrating element of the bone transducer device to vibrate at a particular frequency and/or at a particular intensity to generate an audio signal that has the particular frequency and/or a particular sound pressure level. The audio signal may propagate from the bone transducer device to the inner ear (e.g., of an ear of the subject associated with the bone transducer device) via one or more or more bones, such as a mastoid process, a temporal bone, and/or the like. As another example, for a dpOAE test, a bone transducer device may cause a first vibrating element of the bone transducer device to vibrate at a first frequency and/or at a first intensity to generate a first audio signal that has the first frequency and/or a first sound pressure level, and may cause a second vibrating element of the bone transducer device to vibrate at a second frequency and/or at a second intensity to generate a second audio signal that has the second frequency and/or a second sound pressure level. The bone transducer device may generate the first audio signal and the second audio signal at the same time so that the first audio signal and the second audio signal may simultaneously propagate from the bone transducer device to the inner ear via the one or more bones.

As shown by reference numbers 114-1 and 114-2, some implementations contemplate two ears of the subject being subjected to an OAE audio test at the same time or nearly the same time. In some implementations, a first bone transducer device may generate one or more first audio signals that propagate to an inner ear of a first ear of the subject at the same time a second bone transducer device generates one or more second audio signals that propagate to an inner ear of a second ear of the subject. Additionally, or alternatively, a first bone transducer device may generate one or more first audio signals that propagate to an inner ear of a first ear of the subject before or after a second bone transducer device generates one or more second audio signals that propagate to an inner ear of a second ear of the subject (e.g., the first bone transducer device and the second bone transducer device may each operate in a manner so as to not generate audio signals that may interfere with audio signals generated by the other).

Figure 1F:
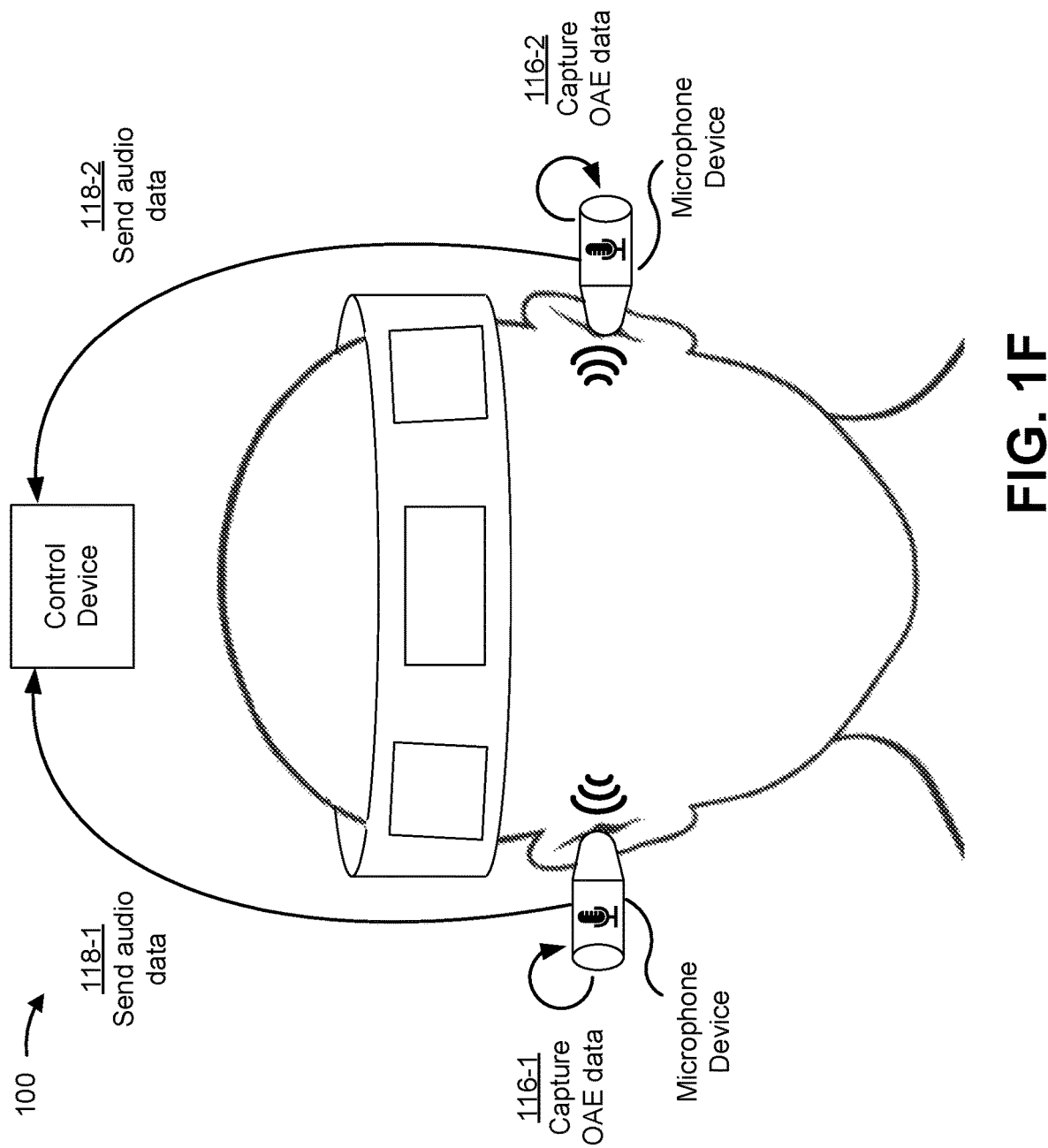

As shown in FIG. 1F and by reference numbers 116-1 and 116-2, each of the one or more microphone devices, while capturing audio data, may capture OAE data associated with an ear. The OAE data may include data concerning an OAE created by the outer hair cells of the cochlea of the ear in response to one or more audio signals generated by an associated bone conduction device. The microphone device may capture audio data for an amount of time after the one or more audio signals are generated (e.g., 10 milliseconds (ms), 20 ms, 30 ms, and/or the like) to allow the OAE data to be captured by the microphone device. The microphone device may cease capturing audio data after the amount of time elapses. In this way, a microphone device may capture audio data that includes a background noise print (e.g., as described in relation to FIG. 1D) and/or OAE data associated with an ear.

As shown by reference numbers 118-1 and 118-2, each of the one or more microphone devices may send audio data to the control device. For example, a first microphone device may send first audio data to the control device and a second microphone device may send second audio data to the control device.

Figure 1G:
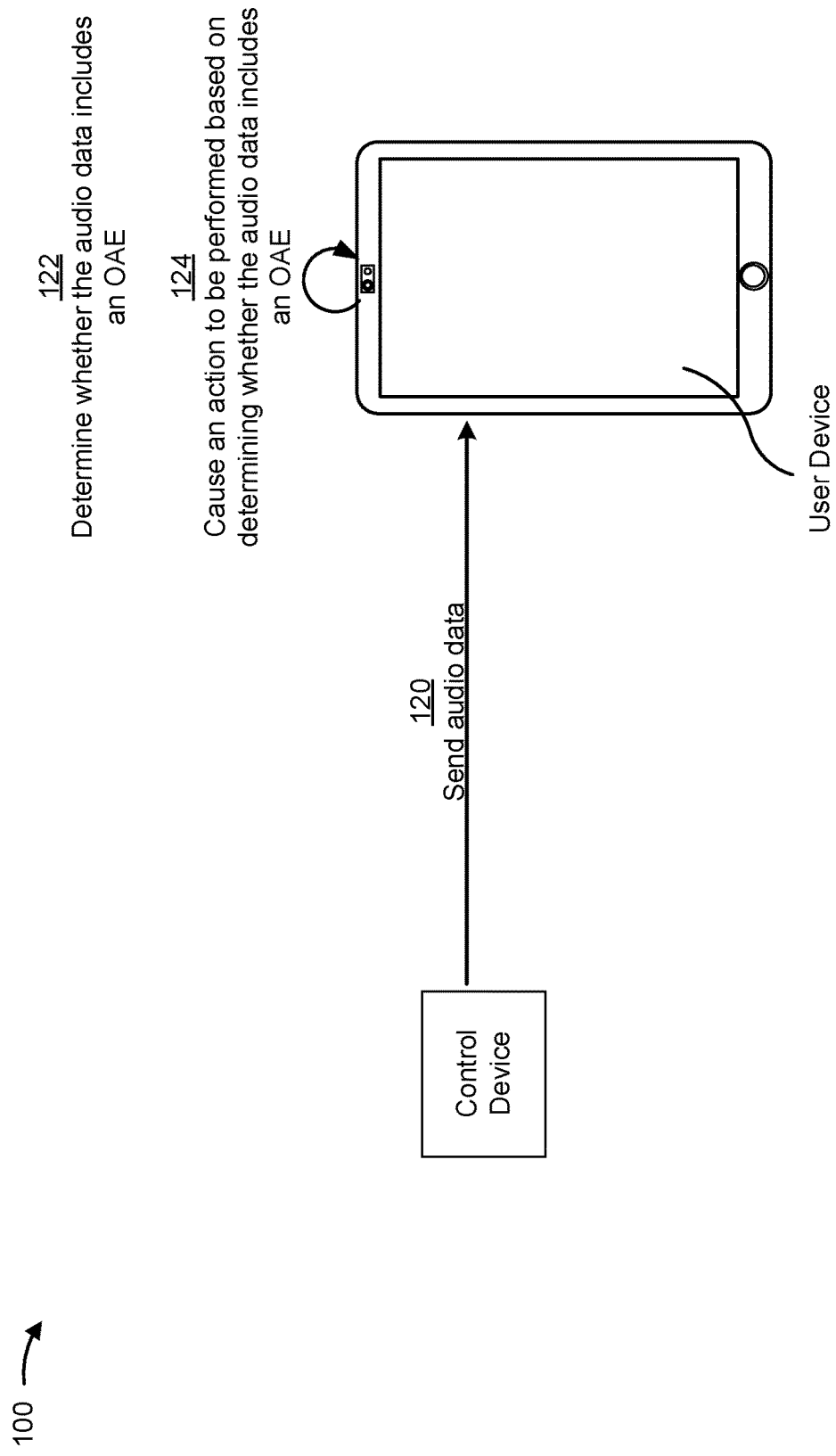

As shown in FIG. 1G and by reference number 120, the control device may send audio data to the user device. For example, after the control device receives audio data from a microphone device, the control device may send the audio data to the user device. Additionally, or alternatively, after the control device receives first audio data from a first microphone device and second audio data from a second microphone device, the control device may send the first audio data and/or the second audio data to the user device.

As shown by reference number 122, the user device may determine whether audio data includes an OAE (e.g., determine whether each of the audio data, the first audio data, the second audio data, and/or the like received from the control device includes a respective OAE). In some implementations, the user device may process the audio data using one or more audio processing techniques before determining whether the audio data includes an OAE. For example, the user device may process the audio data to create a waveform. The waveform may include one or more components that respectively correspond to the background noise print and/or OAE data of the audio data. For example, the waveform may include a waveform component associated with the background noise print, a waveform component associated with the OAE data, and/or the like.

In some implementations, the user device may process the waveform component associated with the OAE data using a discrete Fast Fourier Transform (FFT) to convert the waveform component associated with the OAE data into an OAE data frequency domain (e.g., a representation indicating one or more frequency components associated with the waveform component associated with the OAE data). For example, the user device may apply the below FFT formula to the waveform component associated with the OAE data to generate the OAE data frequency domain:

$$Y(k) = \sum_{j=1}^{n} X(j) W_n^{(j-1)(k-1)}, \text{ where } W_n = e^{-2*pi*i/n}$$

In some implementations, the user device may apply one or more filters to the OAE data frequency domain to improve an overall signal-to-noise ratio of the OAE data frequency domain. For example, the user device may apply a low pass filter to remove high frequency noise, a bandpass filter to remove noise outside an area that includes an expected OAE frequency, a high pass filter to remove low frequency noise, and/or the like.

Additionally, or alternatively, the user device may process the waveform component associated with the background noise print using an FFT to convert the waveform component associated with the background noise print into a background noise print frequency domain (e.g., a representation indicating one or more frequency components associated with the waveform component associated with the background noise print). The user device may subtract the background noise print frequency domain from the OAE data frequency domain to remove information concerning background noise from the OAE data frequency domain.

In some implementations, the user device may process the OAE frequency data domain to determine whether the audio data includes an OAE. For example, the user device may identify and/or determine an expected OAE frequency (e.g., for a tOAE test, the expected OAE frequency may be the same frequency as an audio signal generated by a bone transducer device; for a dpOAE test, the expected OAE frequency may be a function of a first frequency of a first audio signal and a second frequency of a second audio signal generated by a bone transducer device (e.g., the expected dpOAE frequency may be equal to two times the first frequency minus the second frequency (e.g., 2*f1−f2); and/or the like). The user device may process the OAE data frequency domain (e.g., using a peak detection algorithm) to determine a sound pressure level (e.g., an amplitude) associated with the expected OAE frequency. Accordingly, the user device may determine whether the sound pressure level associated with the expected OAE frequency satisfies a threshold, to determine whether the audio data includes an OAE.

For example, the user device may determine that the audio data includes an OAE when the sound pressure level associated with the expected OAE frequency satisfies the threshold (e.g., the expected OAE frequency is greater than or equal to the threshold). Additionally, or alternatively, the user device may determine that the audio data does not include an OAE when the sound pressure level associated with the expected OAE frequency does not satisfy the threshold (e.g., the expected OAE frequency is less than the threshold).

In some implementations, the user device may use a machine learning model to determine the threshold. In some implementations, a different device, such as a server device, may generate and/or train the machine learning model to determine the threshold. For example, the different device may obtain and process historical information (e.g., historical information concerning audio tests, historical information concerning subjects of the audio tests, historical audio data associated with the audio tests, information concerning analysis of the historical audio data (e.g., information concerning determinations on whether the historical audio includes OAEs), and/or the like) to generate and/or train the machine learning model to determine a threshold for an expected OAE frequency.

In some implementations, to generate the machine learning model, the different device may perform a set of data manipulation procedures to pre-process the historical information. The monitoring platform may use a data pre-processing procedure, a model training procedure, a model verification procedure, and/or the like to pre-process the historical information to generate processed historical information. For example, the monitoring platform may pre-process the historical information to remove irrelevant information, confidential data, corrupt data, and/or the like; to replace personal information with generic information; to infer and/or to address missing information and/or to remove records that include missing information; and/or the like. In this way, the monitoring platform may organize thousands, millions, or billions of data entries for machine learning and model generation.

In some implementations, the different device may perform a training operation when generating the machine learning model. For example, the monitoring platform may portion the historical information into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, a minimum feature set may be created from pre-processing and/or dimensionality reduction of the historical information. In some implementations, the different device may train the machine learning model on this minimum feature set, thereby reducing processing required to train the machine learning model, and may apply a classification technique to the minimum feature set.

When training the machine learning model, the different device may utilize a random forest classifier technique to train the machine learning model. For example, the different device may utilize a random forest classifier technique to construct multiple decision trees during training and may output a classification of the historical information. As another example, the different device may utilize a random forest regression technique to construct multiple decision trees during training and may output a numeric predication associated with the historical information. Additionally, or alternatively, when training the machine learning model, the different device may utilize one or more gradient boosting techniques, such as an xgboost classifier technique, an xgboost regression technique, a gradient boosting machine (GBM) technique, a gradient boosting tree, and/or the like to generate a prediction model from a set of weak prediction models.

When training the machine learning model, the different device may utilize a logistic regression technique to train the machine learning model. For example, the different device may utilize a binary classification of the historical information (e.g., whether the historical information is indicative of a particular accurate prediction), a multi-class classification of the historical information (e.g., whether the historical information is indicative of one or more accurate predictions), and/or the like to train the machine learning model. Additionally, or alternatively, when training the machine learning model, the different device may utilize a naïve Bayes classifier technique to train the machine learning model. For example, the behavioral analytics platform may utilize binary recursive partitioning to divide the historical information into various binary categories (e.g., starting with whether the historical information is indicative of a particular accurate prediction). Based on using recursive partitioning, the different device may reduce utilization of computing resources relative to manual, linear sorting and analysis of data points, thereby enabling use of thousands, millions, or billions of data points to train a machine learning model, which may result in a more accurate machine learning model than using fewer data points.

Additionally, or alternatively, when training the machine learning model, the different device may utilize a support vector machine (SVM) classifier technique. For example, the different device may utilize a linear model to implement non-linear class boundaries, such as via a max margin hyperplane. Additionally, or alternatively, when utilizing the SVM classifier technique, the different device may utilize a binary classifier to perform a multi-class classification. Use of an SVM classifier technique may reduce or eliminate overfitting, may increase a robustness of the machine learning model to noise, and/or the like.

In some implementations, the different device may train the machine learning model using a supervised training procedure. In some implementations, the different device may receive additional input to the machine learning model from a subject matter expert. In some implementations, the different device may use one or more other model training techniques, such as a neural network technique, a latent semantic indexing technique, and/or the like. For example, the different device may perform a multi-layer artificial neural network processing technique (e. g, using a recurrent neural network architecture, a two-layer feedforward neural network architecture, a three-layer feedforward neural network architecture, and/or the like) to perform pattern recognition with regard to patterns in the historical information. In this case, use of the artificial neural network processing technique may improve an accuracy of a supervised learning model generated by the different device by being more robust to noisy, imprecise, or incomplete data, and by enabling the different device to detect patterns and/or trends undetectable to human analysts or systems using less complex techniques. Furthermore, when using a recurrent neural network architecture, long short-term memory (LSTM) may be employed to classify, make predictions, and/or otherwise process time-series data, which may be useful to predict how patterns change over time (e.g., over a month, a year, and/or the like).

In this way, the different device may use artificial intelligence techniques, machine learning techniques, deep learning techniques, and/or the like to determine one or more associations between historical information and a determination indicating a threshold.

In some implementations, the user device may obtain the machine learning model from the different device. For example, the different device may send the machine learning model to the user device and/or the user device may request and receive the machine learning model from the different device. In some implementations, the different device may update and send (e.g., on a scheduled basis, on an on-demand basis, on a triggered basis, and/or the like) the machine learning model to the different device and/or the user device may request and receive the updated machine learning model from the different device.

As shown by reference number 124, the user device may cause at least one action be performed based on determining whether the audio data includes an OAE. For example, the user device may cause the user device to display the OAE frequency data domain, information that indicates the expected OAE frequency, information that indicates the sound pressure level associated with the expected OAE frequency, information indicating the threshold, information indicating whether the audio data includes an OAE, and/or the like. Additionally, or alternatively, the user device may store the audio data, the OAE frequency data domain, the expected OAE frequency, the sound pressure level associated with the expected OAE frequency, the threshold, information indicating whether the audio data includes an OAE, and/or the like in a data structure (e.g., a data structure included in the user device, a data structure associated with a server device, a cloud-based data structure, and/or the like). In some implementations, the user device may send the audio data, the OAE frequency data domain, the expected OAE frequency, the sound pressure level associated with the expected OAE frequency, the threshold, information indicating whether the audio data includes an OAE, and/or the like to another device, such as a server device associated with a health services organization.

As another example, when the user device determines that the audio data includes an OAE, the user device may generate a message indicating that the user device determined than an OAE is included in the audio data and/or that the subject has passed the audio test. Accordingly, the user device may cause the user device to display the message on the display screen of the user device. Additionally, or alternatively, the user device may cause the message to be stored in a data structure and/or sent to another device.

As another example, when the user device determines that the audio data does not include an OAE, the user device may generate a message indicating that the user device determined than an OAE is not included in the audio data, that the subject has not passed the audio test, that the subject should take the audio test again, that the subject should take one or more additional audio tests, and/or the like. Accordingly, the user device may cause the user device to display the message on the display screen of the user device. Additionally, or alternatively, the user device may cause the message to be stored in a data structure and/or sent to another device.

In an additional example, when the user device determines that the audio data does not include an OAE, the user device may cause instructions regarding positioning of the one or more bone transducer devices and the one or more microphone devices to be displayed on the display screen of the device to assist the user and/or subject in retaking the audio test. In another example, the user device may determine an availability of a doctor (e.g., by communicating with a device associated with the doctor) and automatically schedule, based on the availability of the doctor, a time for the subject to meet with the doctor (e.g., to undergo additional hearing tests).

As indicated above, FIGS. 1A-1G are provided merely as examples. Other examples may differ from what is described with regard to FIGS. 1A-1G. Further, the number and arrangement of devices and networks shown in FIGS. 1A-1G are provided as an example. In practice, there may be additional devices and/or networks, fewer devices and/or networks, different devices and/or networks, or differently arranged devices and/or networks than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) of example implementation 100 may perform one or more functions described as being performed by another set of devices of example implementation 100.

Figure 2A:
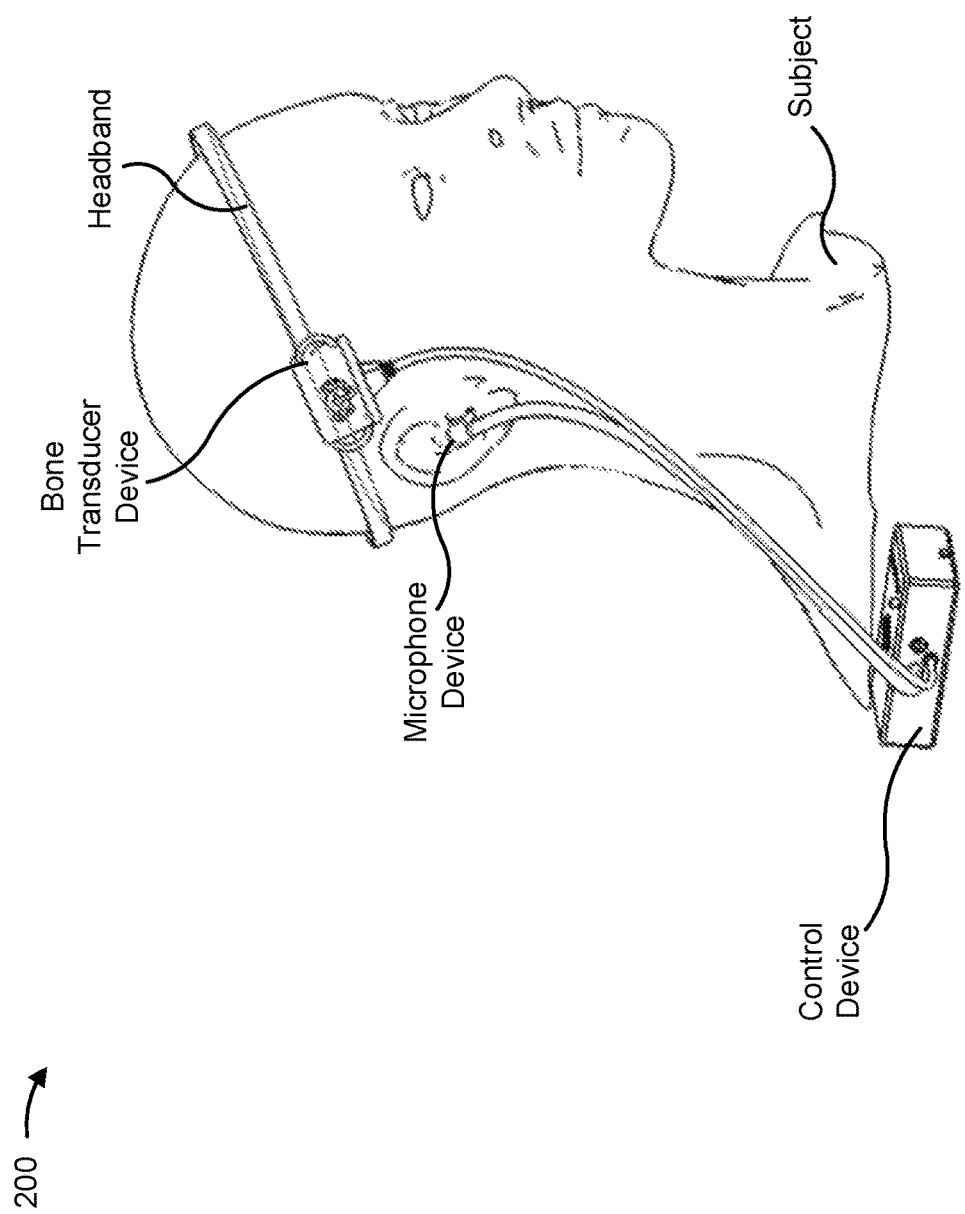
FIGS. 2A-2C are diagrams of example devices described herein
Figure 2B:
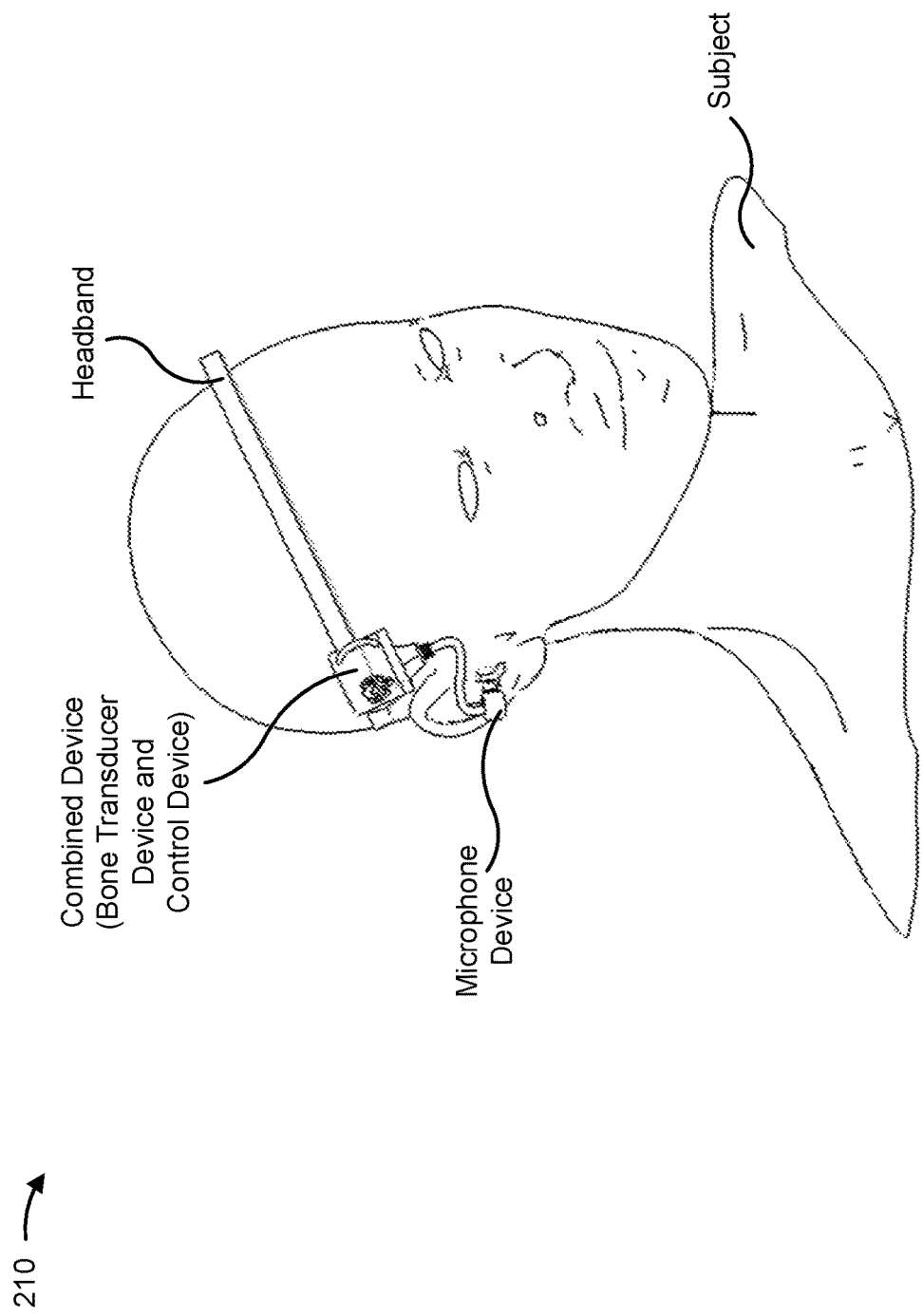
Figure 2C:
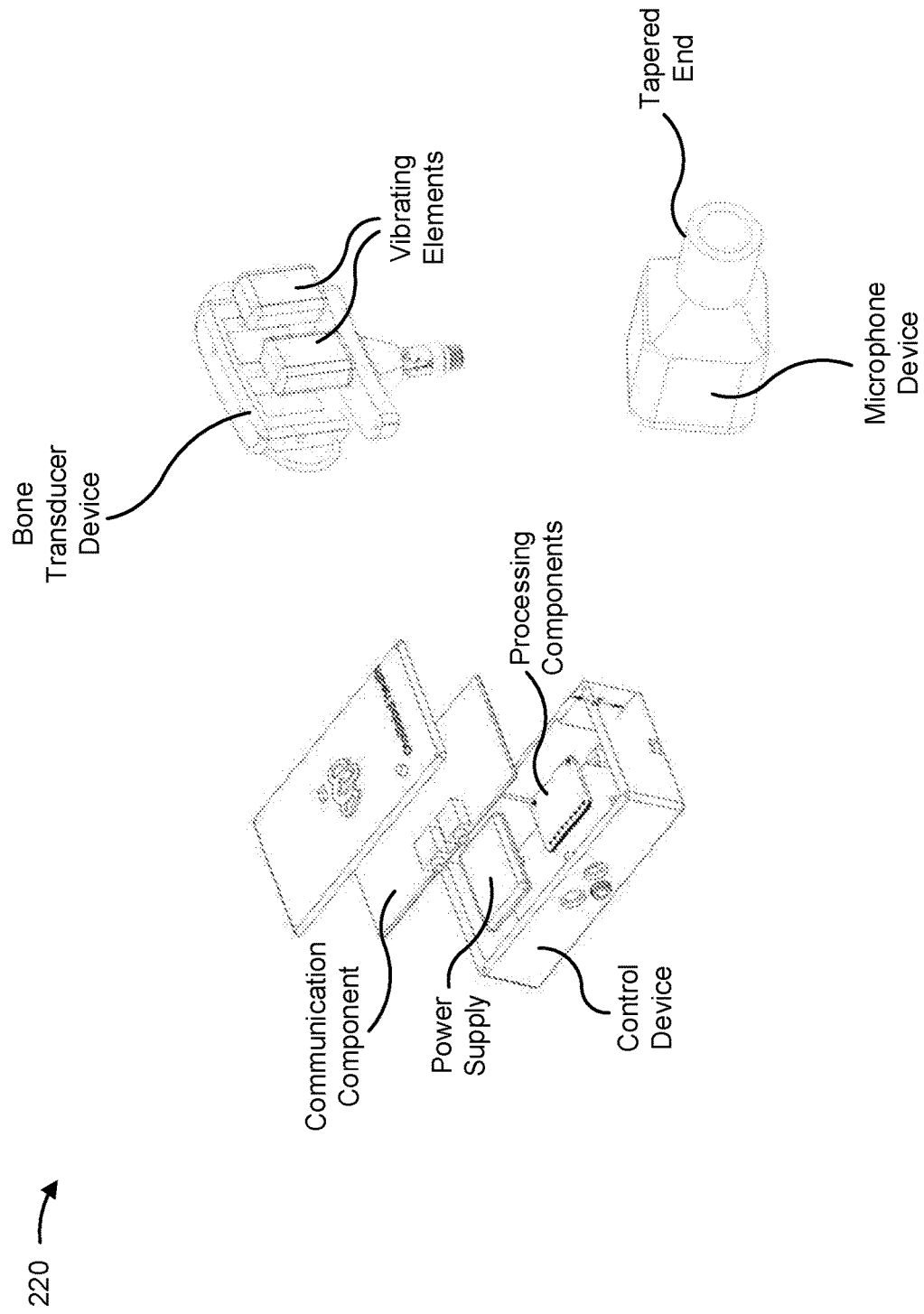

FIGS. 2A-2C are diagrams of example devices described herein. FIG. 2A is a diagram 200 of an example bone conduction OAE testing apparatus that includes a headband, a bone transducer device, a microphone device, and a control device. As shown in FIG. 2A, a subject is wearing the headband on and/or around the head of the subject. The headband physically supports the bone transducer device and causes the bone transducer device to contact the head of the subject at an area near an ear of the subject (e.g., on a mastoid process of the subject). The bone transducer device is connected to the control device via a wired connection. The control device is separated from the headband, but connected to the microphone device, which is inserted into an ear canal of the ear of the subject, via a wired connection. The control device may communicate with a user device and control the bone transducer device and the microphone device, as described herein. The bone transducer device may generate one or more audio signals and the microphone device may capture audio data, as described herein. The user device may obtain the audio data, determine whether the audio data includes an OAE, and cause at least one action to be performed, as described herein.

FIG. 2B is a diagram 210 of an example bone conduction OAE testing apparatus that includes a headband, a combined device comprising a bone transducer device and a control device, and a microphone device. As shown in FIG. 2B, a subject is wearing the headband on and/or around the head of the subject. The headband physically supports the combined device (that includes the bone transducer device and the control device) and causes the combined device to contact the head of the subject such that the bone transducer device contacts an area near an ear of the subject (e.g., on a mastoid process of the subject). The combined device is connected to the microphone device, which is inserted into an ear canal of the ear of the subject, via a wired connection. The control device may communicate with a user device and control the bone transducer device and the microphone device, as described herein. The bone transducer device may generate one or more audio signals and the microphone device may capture audio data, as described herein. The user device may obtain the audio data, determine whether the audio data includes an OAE, and cause at least one action to be performed, as described herein.

FIG. 2C is a diagram 220 of an example control device, an example bone transducer device, and an example microphone device. As shown in FIG. 2C, the control device may include a power supply (e.g., a battery, such as lithium ion battery), a communication component (e.g., a wireless communication chip, such as a Bluetooth communication chip), and processing components (e.g., a processor, memory, and/or the like). The bone transducer device may include one or more vibrating elements (e.g., for generating audio signals). The microphone device may include a microphone (not shown) and a tapered end for inserting into an ear canal of an ear.

As indicated above, FIGS. 2A-2C are provided merely as an example. Other examples may differ from what is described with regard to FIGS. 2A-2C.

Figure 3:
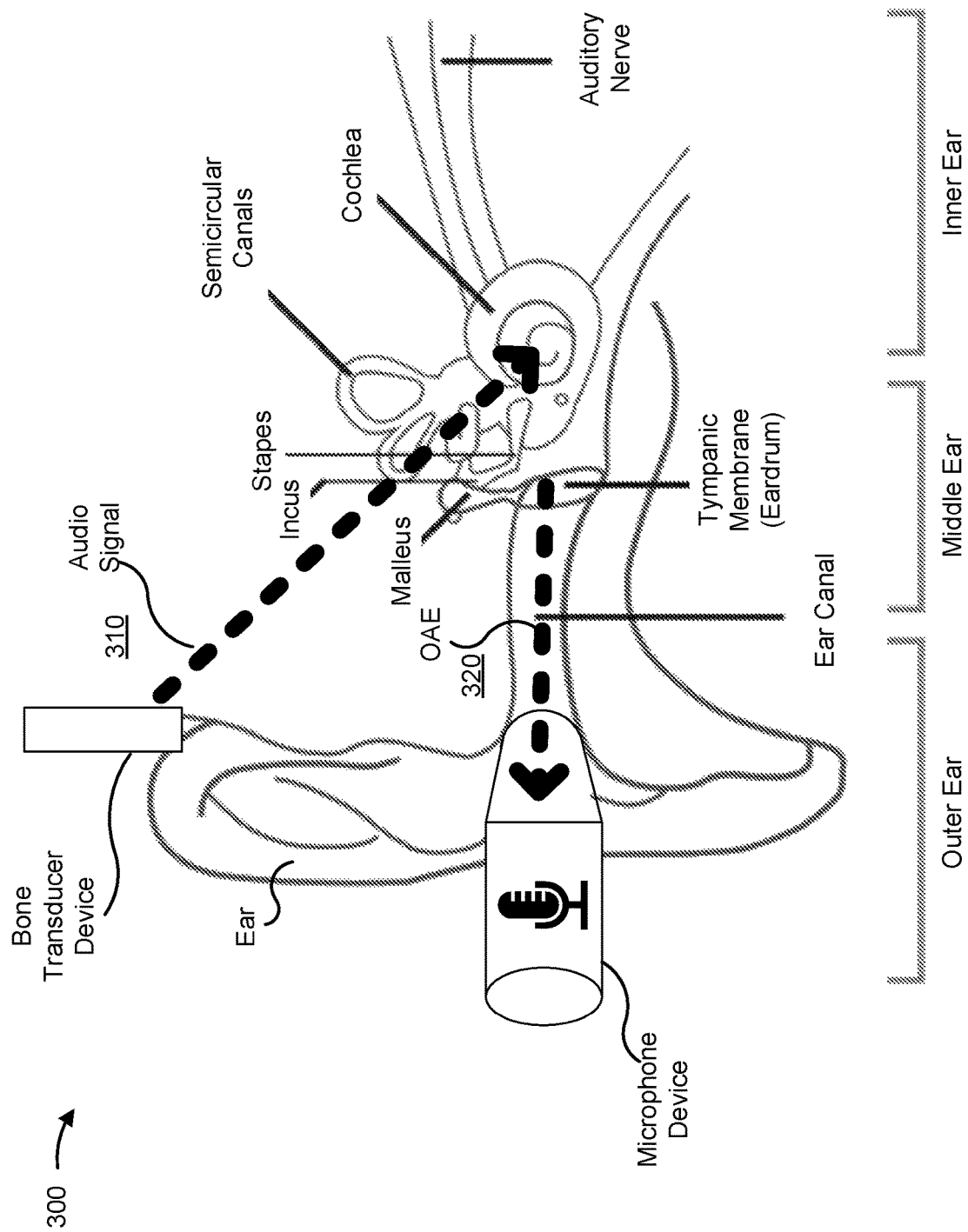
FIG. 3 is a diagram of an example bone conduction otoacoustic emission (OAE) test.

FIG. 3 is a diagram of an example bone conduction otoacoustic emission (OAE) test described herein. As shown by reference number 310, a bone transducer device may cause a vibrating element of the bone transducer to vibrate to generate an audio signal (e.g., with a particular frequency and/or a particular sound pressure level). The audio signal may propagate from the bone transducer device to the inner ear (e.g., the cochlea) via one or more or bones (e.g., a mastoid process, a temporal bone, and/or the like). The audio signal may stimulate the outer hair cells of the cochlea, which may cause the one or more outer hair cells to create an OAE. As shown by reference number 320, the OAE may propagate from the cochlea to a microphone device via the tympanic membrane (e.g., the eardrum) and/or the ear canal. The microphone device may capture OAE data concerning the OAE while capturing audio data concerning the ear.

As indicated above, FIG. 3 is provided merely as an example. Other examples may differ from what is described with regard to FIG. 3.

Figure 4:
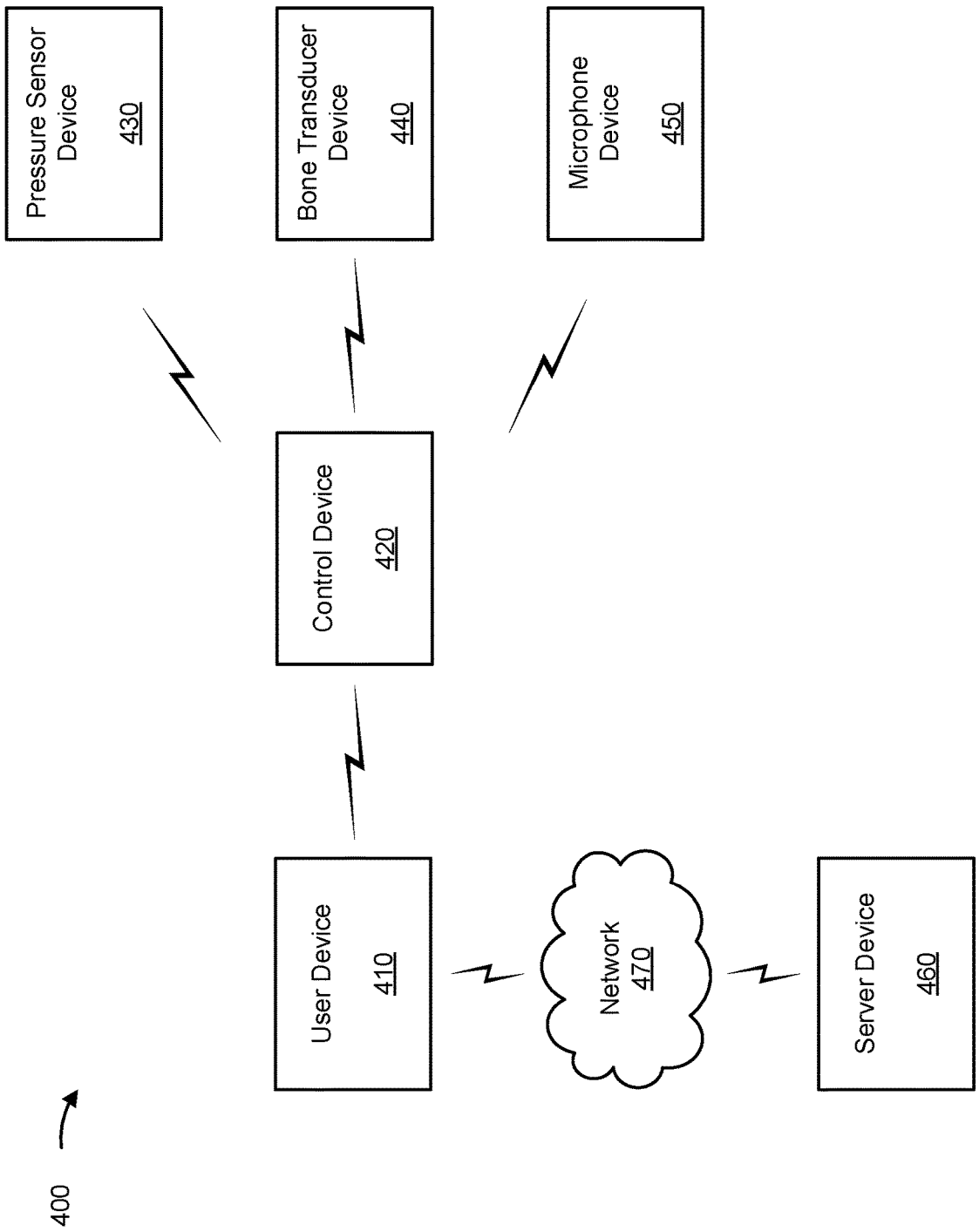
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include user device 410, control device 420, pressure sensor device 430, bone transducer device 440, microphone device 450, server device 460, network 470, and/or the like. Devices of environment 400 may interconnect via wired connections, wireless connections, or a combination of wired and wireless connections.

User device 410 includes one or more devices capable of receiving, generating, storing, processing, and/or providing information, such as information described herein. For example, user device 410 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. In some implementations, user device 410 may receive a request to initiate an audio test; generate one or more instructions to control pressure sensor device 430, bone transducer device 440, and/or microphone device 450 via control device 420; send the one or more instructions to control device 420; receive audio data from control device 420; determine whether the audio data includes an OAE; cause at least one action to be performed based on determining whether an OAE is included in the audio data; and/or the like. In some implementations, user device 410 may communicate with server device 460 (e.g., via network 470) to store and/or obtain data from a data structure associated with server device 460, to obtain a machine learning model generated and/or trained by server device 460, and/or the like.

Control device 420 includes one or more devices capable of receiving, generating, storing, processing, and/or providing information, such as information described herein. Control device 420 may include a power supply (e.g., a battery, such as lithium ion battery, an alkaline battery, a power cell, and/or the like) that provides power (e.g., via direct current (DC) power lines) to control device 420, pressure sensor device 430, bone transducer device 440, microphone device 450, and/or the like. Control device 420 may include an on/off switch that allows a user and/or subject to manually turn power on or off to control device 420, pressure sensor device 430, bone transducer device 440, microphone device 450, and/or the like. Control device 420 may include a communication component (e.g., a wireless communication chip, such as a Bluetooth communication chip (e.g., an RN-52 Bluetooth communication chip designed specifically to handle audio data); a wired communication chip, such as an Ethernet communication chip; and/or the like) to communicate with user device 410, pressure sensor device 430, bone transducer device 440, microphone device 450, and/or the like. Control device 420 may include processing components, such as a processor, memory, operational amplifiers, audio amplifiers, digital to analog signal converters, and/or the like. In some implementations, control device 420 may include a custom field-programmable gate array (FPGA) chip or microcontroller capable of handling audio data. In some implementations, control device 420 may receive one or more instructions from user device 410; control pressure sensor device 430, bone transducer device 440, microphone device 450; receive audio data from microphone device 450; send the audio data to user device 410; and/or the like.

Pressure sensor device 430 includes one or more devices capable of receiving, generating, storing, processing, and/or providing information, such as information described herein. Pressure sensor device 430 may include a strain gauge, an electromagnetic pressure sensor, a capacitive pressure sensor, and/or the like. In some implementations, pressure sensor device 430 may determine pressure data concerning tautness of a headband on a head of a subject; send the pressure data to the control device 420; and/or the like.

Bone transducer device 440 includes one or more devices capable of receiving, generating, storing, processing, and/or providing information, such as information described herein. Bone transducer device 440 may include one or more vibrating elements (e.g., one or more transducers) and may be placed (e.g., via a headband or similar supporting structure) at a position on a head of a subject, such as on a mastoid process, a temporal bone, and/or an area near an ear of the subject. In some implementations, bone transducer device 440 may receive audio stimulus instructions from control device 420; cause a vibrating element of bone transducer device 440 to vibrate at a particular frequency and/or at a particular intensity to generate an audio signal that has the particular frequency and/or a particular sound pressure level; cause a first vibrating element of the bone transducer device to vibrate at a first frequency and/or at a first intensity to generate a first audio signal that has the first frequency and/or a first sound pressure level, and may cause a second vibrating element of the bone transducer device to vibrate at a second frequency and/or at a second intensity to generate a second audio signal that has the second frequency and/or a second sound pressure level; and/or the like.

Microphone device 450 includes one or more devices capable of receiving, generating, storing, processing, and/or providing information, such as information described herein. Microphone device 450 may include one or more microphones to capture OAE data (e.g., the one or more microphones may be unidirectional, may be omnidirectional, may have a sensitivity of at least −40 dBA, may have a range of at least 15 kHz, and/or the like). Microphone device 450 may include a case and/or a tapered end that can fit into an ear canal of an ear of a subject (e.g., the case and/or tapered end may be less than 10 mm in diameter) and may include an ear tip that is used to secure microphone device 450 in the ear canal and seal the ear canal from external noise. In some implementations, microphone device 450 may receive recording instructions from control device 420; capture audio data (e.g., that includes a background noise print and/or OAE data); send the audio data to control device 420; and/or the like.

Server device 460 includes one or more devices capable of storing, processing, and/or routing information, such as information described herein. In some implementations, server device 460 may include a communication interface that allows server device 460 to receive information from and/or transmit information to user device 410 (e.g., via network 470). In some implementations, server device 460 may generate and/or train a machine learning model; send the machine learning model to user device 410; and/or the like.

Network 470 includes one or more wired and/or wireless networks. For example, network 470 may include a cellular network (e.g., a long-term evolution (LTE) network, a code division multiple access (CDMA) network, a 3G network, a 4G network, a 5G network (e.g., a 5G mmW network), another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

The number and arrangement of devices and networks shown in FIG. 4 are provided as one or more examples. In practice, there may be additional devices, fewer devices, different devices, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
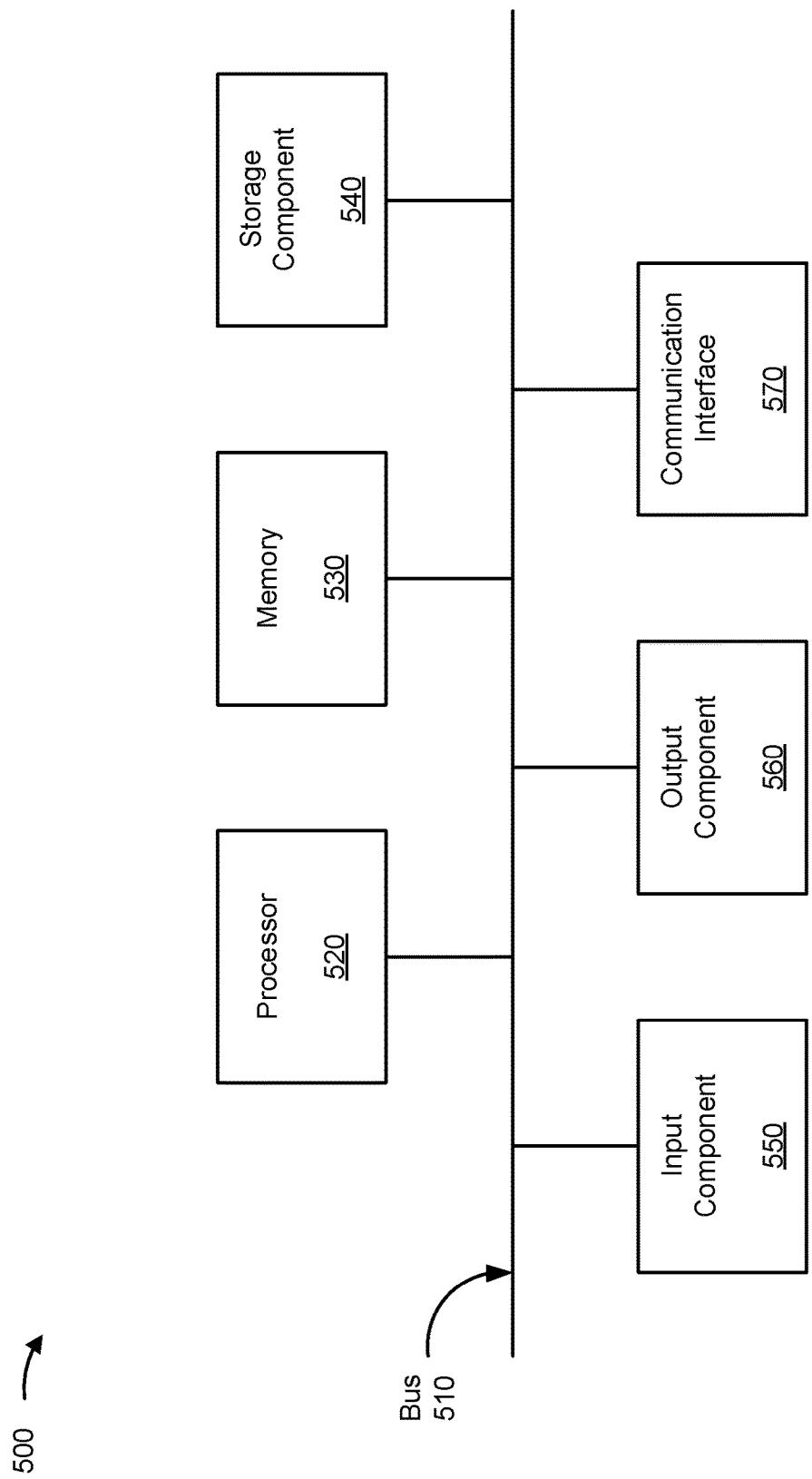
FIG. 5 is a diagram of example components of one or more devices of FIG. 2.

FIG. 5 is a diagram of example components of a device 500. Device 500 may correspond to user device 410, control device 420, pressure sensor device 430, bone transducer device 440, microphone device 450, and/or server device 460. In some implementations, user device 410, control device 420, pressure sensor device 430, bone transducer device 440, microphone device 450, and/or server device 460 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 includes a component that provides output information from device 500 (via, e.g., a display, a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. As used herein, the term "computer-readable medium" refers to a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
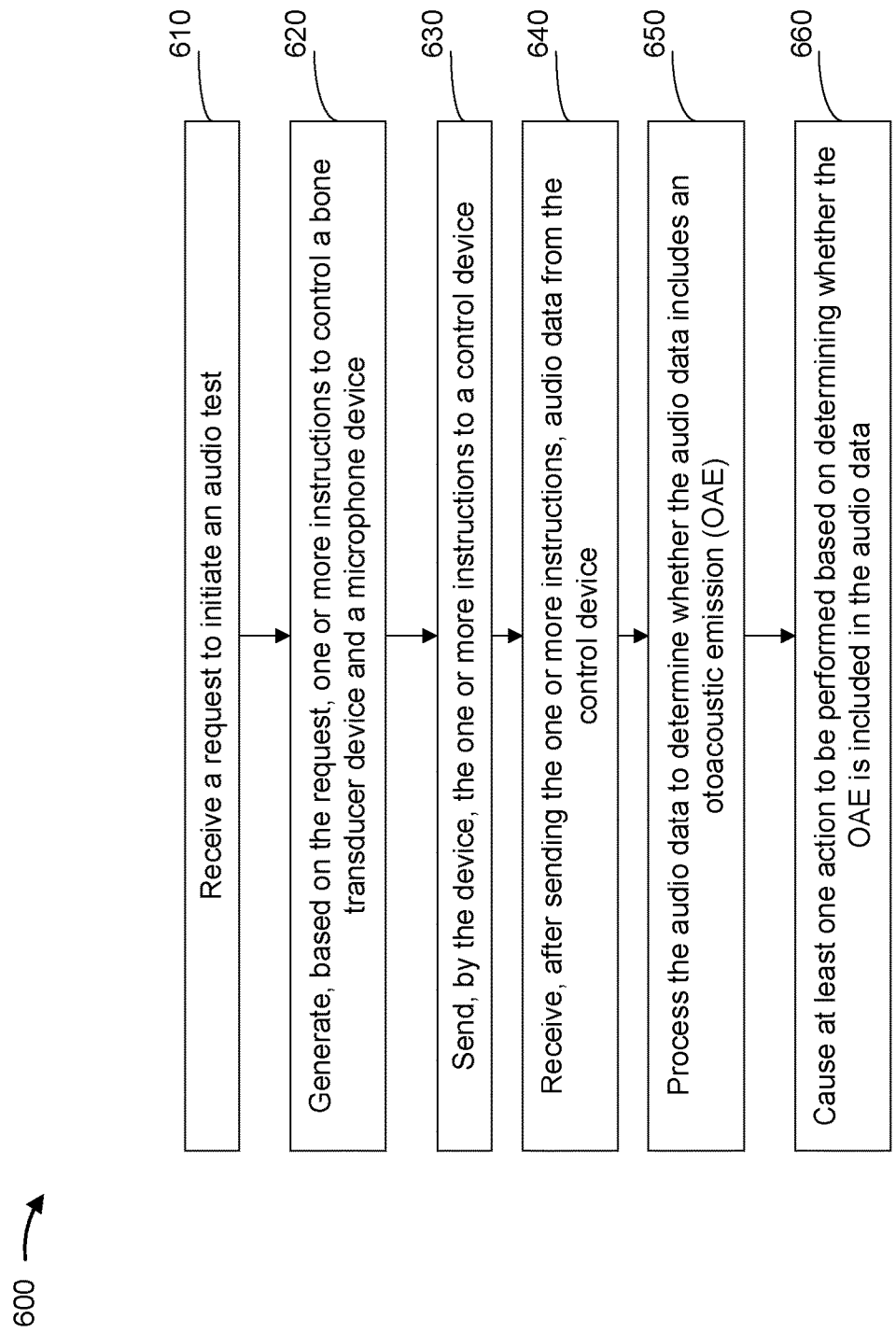

FIG. 6 is a flow chart of an example process 600 for facilitating a bone conduction OAE test. In some implementations, one or more process blocks of FIG. 6 may be performed by a user device (e.g., user device 410). In some implementations, one or more process blocks of FIG. 6 may be performed by another device or a group of devices separate from or including the user device, such as a control device (e.g., control device 420), a pressure sensor device (e.g., pressure sensor device 430), a bone transducer device (e.g., bone transducer device 440), a microphone device (e.g., microphone device 450), a server device (e.g., server device 460), and/or the like.

As shown in FIG. 6, process 600 may include receiving a request to initiate an audio test (block 610). For example, the user device (e.g., using processor 520, memory 530, storage component 540, input component 550, output component 560, communication interface 570, and/or the like) may receive a request to initiate an audio test, as described above.

As further shown in FIG. 6, process 600 may include generating, based on the request, one or more instructions to control a bone transducer device and a microphone device (block 620). For example, the user device (e.g., using processor 520, memory 530, storage component 540, input component 550, output component 560, communication interface 570, and/or the like) may generate, based on the request, one or more instructions to control a bone transducer device and a microphone device, as described above.

As further shown in FIG. 6, process 600 may include sending the one or more instructions to a control device (block 630). For example, the user device (e.g., using processor 520, memory 530, storage component 540, input component 550, output component 560, communication interface 570, and/or the like) may send the one or more instructions to a control device, as described above.

As further shown in FIG. 6, process 600 may include receiving, after sending the one or more instructions, audio data from the control device (block 640). For example, the user device (e.g., using processor 520, memory 530, storage component 540, input component 550, output component 560, communication interface 570, and/or the like) may receive, after sending the one or more instructions, audio data from the control device, as described above.

As further shown in FIG. 6, process 600 may include processing the audio data to determine whether the audio data includes an OAE (block 650). For example, the user device (e.g., using processor 520, memory 530, storage component 540, input component 550, output component 560, communication interface 570, and/or the like) may process the audio data to determine whether the audio data includes an OAE, as described above.

As further shown in FIG. 6, process 600 may include causing at least one action to be performed based on determining whether the OAE is included in the audio data (block 660). For example, the user device (e.g., using processor 520, memory 530, storage component 540, input component 550, output component 560, communication interface 570, and/or the like) may cause at least one action to be performed based on determining whether the OAE is included in the audio data, as described above.

Process 600 may include additional implementations, such as any single implementation or any combination of implementations described below and/or in connection with one or more other processes described elsewhere herein.

In a first implementation, the request indicates one or more sound frequencies to be tested.

In a second implementation, alone or in combination with the first implementation, the one or more instructions include a set of instructions to cause the bone transducer device to generate an audio signal at a particular sound frequency.

In a third implementation, alone or in combination with one or more of the first and second implementations, the one or more instructions include a first set of instructions to cause the bone transducer device to generate a first audio signal at a first frequency at a particular time, and a second set of instructions to cause the bone transducer device to generate a second audio signal at a second frequency at the particular time.

In a fourth implementation, alone or in combination with one or more of the first through third implementations, sending the one or more instructions to the control device comprises sending the one or more instructions to the control device via a wireless communication protocol.

In a fifth implementation, alone or in combination with one or more of the first through fourth implementations, processing the audio data to determine whether the audio data includes the OAE comprises identifying an expected OAE frequency; processing the audio data to determine a sound pressure level associated with the expected OAE frequency; determining whether the sound pressure level associated with the expected OAE frequency satisfies a threshold; and determining, based on determining that the sound pressure level associated with the expected OAE frequency satisfies the threshold, that the audio data includes the OAE.

In a sixth implementation, alone or in combination with one or more of the first through fifth implementations, processing the audio data to determine whether the audio data includes the OAE comprises processing the audio data to determine a sound pressure level associated with an expected OAE frequency; determining, using a machine learning model, a threshold associated with the expected OAE frequency; determining whether the sound pressure level associated with the expected OAE frequency satisfies the threshold; and determining, based on determining that the sound pressure level associated with the expected OAE frequency satisfies the threshold, that the audio data includes the OAE.

In a seventh implementation, alone or in combination with one or more of the first through sixth implementations, the user device may process, after receiving the audio data from the control device, the audio data using a signal-to-noise boosting technique before processing the audio data to determine whether the audio data includes the OAE.

In an eighth implementation, alone or in combination with one or more of the first through seventh implementations, causing the at least one action to be performed, when the device determines that the audio data includes the OAE, comprises generating a message indicating that the device determined that the OAE is included in the audio data and causing the device to display the message on a display screen of the device.

In a ninth implementation, alone or in combination with one or more of the first through eighth implementations, causing the at least one action to be performed, when the device determines that the audio data does not include the OAE, comprises causing instructions regarding positioning of the bone transducer device and the microphone device to be displayed on a display screen of the device.

In a tenth implementation, alone or in combination with one or more of the first through ninth implementations, causing the at least one action to be performed, when the device determines that the audio data does not include the OAE, comprises determining an availability of a doctor and scheduling, based on the availability of the doctor, a time for a subject of the audio test to meet with the doctor.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
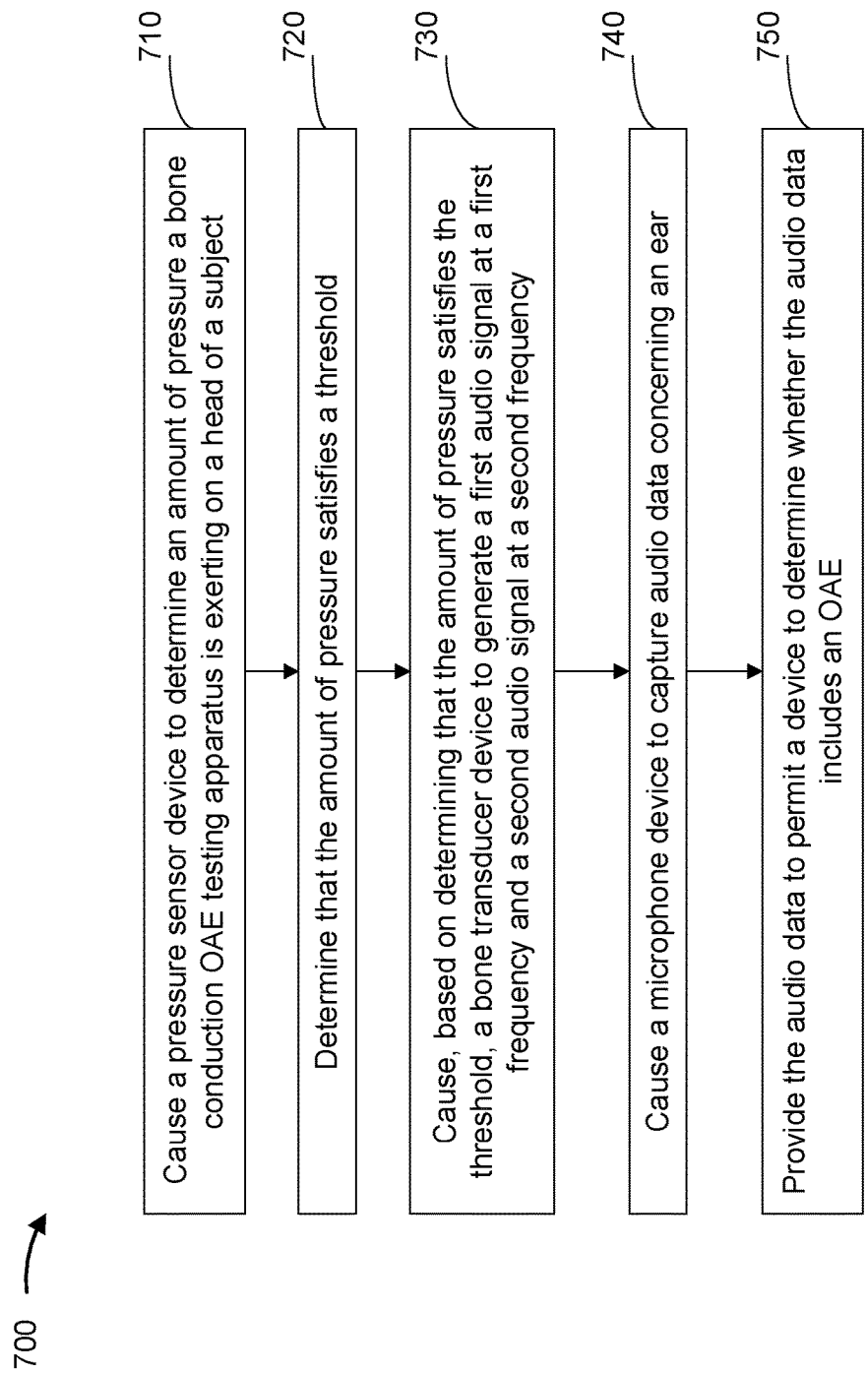

FIG. 7 is a flow chart of an example process 700 for facilitating a bone conduction OAE test. In some implementations, one or more process blocks of FIG. 7 may be performed by a control device (e.g., control device 420). In some implementations, one or more process blocks of FIG. 7 may be performed by another device or a group of devices separate from or including the control device, such as a user device (e.g., user device 410), a pressure sensor device (e.g., pressure sensor device 430), a bone transducer device (e.g., bone transducer device 440), a microphone device (e.g., microphone device 450), a server device (e.g., server device 460), and/or the like.

As shown in FIG. 7, process 700 may include causing a pressure sensor device to determine an amount of pressure a bone conduction OAE testing apparatus is exerting on a head of a subject (block 710). For example, the control device (e.g., using processor 520, memory 530, storage component 540, input component 550, output component 560, communication interface 570, and/or the like) may cause a pressure sensor device to determine an amount of pressure a bone conduction OAE testing apparatus is exerting on a head of a subject, as described above.

As further shown in FIG. 7, process 700 may include determining that the amount of pressure satisfies a threshold (block 720). For example, the control device (e.g., using processor 520, memory 530, storage component 540, input component 550, output component 560, communication interface 570, and/or the like) may determine that the amount of pressure satisfies a threshold, as described above.

As further shown in FIG. 7, process 700 may include causing, based on determining that the amount of pressure satisfies the threshold, a bone transducer device to generate a first audio signal at a first frequency and a second audio signal at a second frequency (block 730). For example, the control device (e.g., using processor 520, memory 530, storage component 540, input component 550, output component 560, communication interface 570, and/or the like) may cause, based on determining that the amount of pressure satisfies the threshold, a bone transducer device to generate a first audio signal at a first frequency and a second audio signal at a second frequency, as described above.

As further shown in FIG. 7, process 700 may include causing the microphone device to capture audio data concerning an ear (block 740). For example, the control device (e.g., using processor 520, memory 530, storage component 540, input component 550, output component 560, communication interface 570, and/or the like) may cause the microphone device to capture audio data concerning an ear, as described above.

As further shown in FIG. 7, process 700 may include providing the audio data to permit a device to determine whether the audio data includes an OAE (block 750). For example, the control device (e.g., using processor 520, memory 530, storage component 540, input component 550, output component 560, communication interface 570, and/or the like) may provide the audio data to permit a device to determine whether the audio data includes an OAE, as described above.

Process 700 may include additional implementations, such as any single implementation or any combination of implementations described below and/or in connection with one or more other processes described elsewhere herein.

In a first implementation, when the bone transducer device includes a first vibrating element and a second vibrating element, causing the bone transducer device to generate the first audio signal at the first frequency and the second audio signal at the second frequency comprises causing the first vibrating element to vibrate at the first frequency and the second vibrating element to vibrate at the second frequency.

In a second implementation, alone or in combination with the first implementation, the second position on the head of the subject is located on a mastoid process or a temporal bone on the same side of the head of the subject as the ear of the subject.

In a third implementation, alone or in combination with one or more of the first and second implementations, causing the bone transducer device to generate the first audio signal at the first frequency and the second audio signal at the second frequency comprises causing the bone transducer device to generate the first audio signal at a particular sound pressure level and at a particular time and causing the bone transducer device to generate the second audio signal at the particular sound pressure level and at the particular time.

In a fourth implementation, alone or in combination with one or more of the first through third implementations, the bone conduction OAE testing apparatus further comprises a headband that includes the pressure sensor device and the bone transducer device, wherein the headband is to cause the pressure sensor device to contact the head of the subject at a first position and cause the bone transducer device to contact the head of the subject at a second position.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flow chart of an example process 800 for facilitating a bone conduction OAE test. In some implementations, one or more process blocks of FIG. 8 may be performed by a control device (e.g., control device 420). In some implementations, one or more process blocks of FIG. 8 may be performed by another device or a group of devices separate from or including the control device, such as a user device (e.g., user device 410), a pressure sensor device (e.g., pressure sensor device 430), a bone transducer device (e.g., bone transducer device 440), a microphone device (e.g., microphone device 450), a server device (e.g., server device 460), and/or the like.

As shown in FIG. 8, process 800 may include causing a pressure sensor device to determine an amount of pressure a bone conduction OAE testing apparatus is exerting on a head of a subject (block 810). For example, the control device (e.g., using processor 520, memory 530, storage component 540, input component 550, output component 560, communication interface 570, and/or the like) may cause a pressure sensor device to determine an amount of pressure a bone conduction OAE testing apparatus is exerting on a head of a subject, as described above.

As further shown in FIG. 8, process 800 may include determining that the amount of pressure satisfies a threshold (block 820). For example, the control device (e.g., using processor 520, memory 530, storage component 540, input component 550, output component 560, communication interface 570, and/or the like) may determine that the amount of pressure satisfies a threshold, as described above.

As further shown in FIG. 8, process 800 may include causing, based on determining that the amount of pressure satisfies the threshold, a first bone transducer device to generate one or more first audio signals and a second bone transducer device to generate one or more second audio signals (block 830). For example, the control device (e.g., using processor 520, memory 530, storage component 540, input component 550, output component 560, communication interface 570, and/or the like) may cause, based on determining that the amount of pressure satisfies the threshold, a first bone transducer device to generate one or more first audio signals and a second bone transducer device to generate one or more second audio signals, as described above.

As further shown in FIG. 8, process 800 may include causing a first microphone device to capture first audio data concerning a first ear and a second microphone device to capture second audio data concerning a second ear (block 840). For example, the control device (e.g., using processor 520, memory 530, storage component 540, input component 550, output component 560, communication interface 570, and/or the like) may cause a first microphone device to capture first audio data concerning the one or more first audio signals and a second microphone device to capture second audio data concerning the one or more second audio signals, as described above.

As further shown in FIG. 8, process 800 may include sending the first audio data to permit a device to determine whether the first audio data includes a first OAE (block 850). For example, the control device (e.g., using processor 520, memory 530, storage component 540, input component 550, output component 560, communication interface 570, and/or the like) may send the first audio data to permit a device to determine whether the first audio data includes a first OAE, as described above.

As further shown in FIG. 8, process 800 may include sending the second audio data to permit the device to determine whether the second audio data includes a second OAE (block 860). For example, the control device (e.g., using processor 520, memory 530, storage component 540, input component 550, output component 560, communication interface 570, and/or the like) may send the second audio data to permit the device to determine whether the second audio data includes a second OAE, as described above.

Process 800 may include additional implementations, such as any single implementation or any combination of implementations described below and/or in connection with one or more other processes described elsewhere herein.

In a first implementation, the control device, sending the first audio data and the second audio data comprises sending the first audio data and the second audio data to the device using a wireless communication protocol.

In a second implementation, alone or in combination with the first implementation, causing the first microphone device to capture the first audio data and the second microphone device to capture the second audio data comprises determining a first duration of time to capture the first audio data and a second duration of time to capture the second audio data; causing, after causing the first bone transducer device to generate the one or more first audio signals, the first microphone device to capture the first audio data for the first duration of time; and causing, after causing the second bone transducer device to generate the one or more second audio signals, the second microphone device to capture the second audio data for the second duration of time.

In a third implementation, alone or in combination with one or more of the first and second implementations, the pressure sensor device is connected to the control device via a first wired connection; the first bone transducer device is connected to the control device via a second wired connection; the second bone transducer device is connected to the control device via a third wired connection; the first microphone device is connected to the control device via a first wireless connection; and the second microphone device is connected to the control device via a second wireless connection.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, a request to initiate an audio test;
generating, by the device and based on the request, one or more instructions to control a bone transducer device and a microphone device;
sending, by the device, the one or more instructions to a control device;
receiving, by the device and after sending the one or more instructions, audio data from the control device;
processing, by the device, the audio data to determine whether the audio data includes an otoacoustic emission (OAE), comprising:
identifying an expected OAE frequency;
processing the audio data to determine a sound pressure level associated with the expected OAE frequency;
determining whether the sound pressure level associated with the expected OAE frequency satisfies a threshold; and
causing, by the device, at least one action to be performed based on determining whether the OAE is included in the audio data.

2. The method of claim 1, wherein the request indicates one or more sound frequencies to be tested.

3. The method of claim 1, wherein the one or more instructions include a set of instructions to cause the bone transducer device to generate an audio signal at a particular sound frequency.

4. The method of claim 1, wherein the one or more instructions include:
a first set of instructions to cause the bone transducer device to generate a first audio signal at a first frequency at a particular time; and
a second set of instructions to cause the bone transducer device to generate a second audio signal at a second frequency at the particular time.

5. The method of claim 1, wherein sending the one or more instructions to the control device comprises:
sending the one or more instructions to the control device via a wireless communication protocol.

6. The method of claim 1,
determining, based on determining that the sound pressure level associated with the expected OAE frequency satisfies the threshold, that the audio data includes the OAE.

7. The method of claim 1, comprising:
determining, using a machine learning model, the threshold associated with the expected OAE frequency.

8. The method of claim 1, further comprising:
processing, after receiving the audio data from the control device, the audio data using a signal-to-noise boosting technique before processing the audio data to determine whether the audio data includes the OAE.

9. The method of claim 1, wherein, when the device determines that the audio data includes the OAE, causing the at least one action to be performed comprises:
generating a message indicating that the device determined that the OAE is included in the audio data; and
causing the device to display the message on a display screen of the device.

10. The method of claim 1, wherein, when the device determines that the audio data does not include the OAE, causing the at least one action to be performed comprises:
causing instructions regarding positioning of the bone transducer device and the microphone device to be displayed on a display screen of the device.

11. The method of claim 1, wherein, when the device determines that the audio data does not include the OAE, causing the at least one action to be performed comprises:
determining an availability of a doctor; and
scheduling, based on the availability of the doctor, a time for a subject of the audio test to meet with the doctor.

12. A bone conduction otoacoustic emission (OAE) testing apparatus, comprising:
a pressure sensor device to be placed at a first position on a head of a subject;
a bone transducer device to be placed at a second position on the head of the subject;
a microphone device to be placed in an ear canal of an ear of the subject; and
a control device to:
cause the pressure sensor device to determine an amount of pressure the bone conduction OAE testing apparatus is exerting on the head of the subject;
determine that the amount of pressure satisfies a threshold;
cause, based on determining that the amount of pressure satisfies the threshold, the bone transducer device to generate a first audio signal at a first frequency and a second audio signal at a second frequency;
cause the microphone device to capture audio data concerning the ear; and
provide the audio data to permit a device to determine whether the audio data includes an OAE.

13. The bone conduction OAE testing apparatus of claim 12, wherein the bone transducer device includes a first vibrating element and a second vibrating element,
wherein the control device, when causing the bone transducer device to generate the first audio signal at the first frequency and the second audio signal at the second frequency, is to:
cause the first vibrating element to vibrate at the first frequency and the second vibrating element to vibrate at the second frequency.

14. The bone conduction OAE testing apparatus of claim 12, wherein the second position on the head of the subject is located on a mastoid process or a temporal bone on the same side of the head of the subject as the ear of the subject.

15. The bone conduction OAE testing apparatus of claim 12, wherein the control device, when causing the bone transducer device to generate the first audio signal at the first frequency and the second audio signal at the second frequency, is to:
cause the bone transducer device to generate the first audio signal at a particular sound pressure level and at a particular time; and cause the bone transducer device to generate the second audio signal at the particular sound pressure level and at the particular time.

16. The bone conduction OAE testing apparatus of claim 12, further comprising:
a headband that includes the pressure sensor device and the bone transducer device, wherein the headband is to cause the pressure sensor device to contact the head of the subject at the first position and cause the bone transducer device to contact the head of the subject at the second position.

17. A bone conduction otoacoustic emission (OAE) testing apparatus, comprising:
a pressure sensor device to be placed at a first position on a head of a subject;
a first bone transducer device to be placed at a second position on the head of the subject;
a second bone transducer device to be placed at a third position on the head of the subject;
a first microphone device to be placed in an ear canal of a first ear of the subject;
a second microphone device to be placed in an ear canal of a second ear of the subject; and
a control device to:
cause the pressure sensor device to determine an amount of pressure the bone conduction OAE testing apparatus is exerting on the head of the subject;
determine that the amount of pressure satisfies a threshold;
cause, based on determining that the amount of pressure satisfies the threshold, the first bone transducer device to generate one or more first audio signals and the second bone transducer device to generate one or more second audio signals;
cause the first microphone device to capture first audio data concerning the first ear and the second microphone device to capture second audio data concerning the second ear;
send the first audio data to permit a device to determine whether the first audio data includes a first OAE; and
send the second audio data to permit the device to determine whether the second audio data includes a second OAE.

18. The bone conduction OAE testing apparatus of claim 17, wherein the control device, when sending the first audio data and the second audio data, is to:
send the first audio data and the second audio data to the device using a wireless communication protocol.

19. The bone conduction OAE testing apparatus of claim 17, wherein the control device, when causing the first microphone device to capture the first audio data and the second microphone device to capture the second audio data, is to:
determine a first duration of time to capture the first audio data and a second duration of time to capture the second audio data;
cause, after causing the first bone transducer device to generate the one or more first audio signals, the first microphone device to capture the first audio data for the first duration of time; and
cause, after causing the second bone transducer device to generate the one or more second audio signals, the second microphone device to capture the second audio data for the second duration of time.

20. The bone conduction OAE testing apparatus of claim 17, wherein:
the pressure sensor device is connected to the control device via a first wired connection;
the first bone transducer device is connected to the control device via a second wired connection;
the second bone transducer device is connected to the control device via a third wired connection;
the first microphone device is connected to the control device via a first wireless connection; and
the second microphone device is connected to the control device via a second wireless connection.

21. A method, comprising:
receiving, by a device, a request to initiate an audio test;
generating, by the device and based on the request, one or more instructions to control a bone transducer device and a microphone device;
sending, by the device, the one or more instructions to a control device;
receiving, by the device and after sending the one or more instructions, audio data from the control device;
processing, by the device, the audio data using a signal-to-noise boosting technique;
processing, by the device, the audio data to determine whether the audio data includes an otoacoustic emission (OAE); and
causing, by the device, at least one action to be performed based on determining whether the OAE is included in the audio data.

* * * * *